(12) United States Patent
Chen et al.

(10) Patent No.: US 11,333,861 B2
(45) Date of Patent: May 17, 2022

(54) IMAGE CAPTURING LENS ASSEMBLY, IMAGING APPARATUS AND ELECTRONIC DEVICE

(71) Applicant: LARGAN PRECISION CO., LTD., Taichung (TW)

(72) Inventors: Chun-Yen Chen, Taichung (TW); Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 184 days.

(21) Appl. No.: 16/779,751

(22) Filed: Feb. 3, 2020

(65) Prior Publication Data

US 2020/0174228 A1 Jun. 4, 2020

Related U.S. Application Data

(63) Continuation of application No. 15/797,211, filed on Oct. 30, 2017, now Pat. No. 10,606,035.

(30) Foreign Application Priority Data

Jun. 3, 2017 (TW) .................................. 106118432

(51) Int. Cl.
*G02B 13/00* (2006.01)
*G02B 13/18* (2006.01)
(Continued)

(52) U.S. Cl.
CPC .......... *G02B 13/0045* (2013.01); *G02B 7/09* (2013.01); *G02B 9/64* (2013.01); *G02B 13/18* (2013.01); *G02B 27/646* (2013.01)

(58) Field of Classification Search
CPC ........ G02B 13/0045; G02B 7/09; G02B 9/64; G02B 13/18
(Continued)

(56) References Cited

U.S. PATENT DOCUMENTS 5,543,970 A 8/1996 Hata et al.
6,795,255 B2 9/2004 Reinecke et al.
(Continued)

FOREIGN PATENT DOCUMENTS

CN 202886713 U 4/2013
CN 204065539 U 12/2014
(Continued)

*Primary Examiner* — James R Greece
(74) *Attorney, Agent, or Firm* — McClure, Qualey & Rodack, LLP

(57) ABSTRACT

An image capturing lens assembly includes seven lens elements, which are, in order from an object side to an image side, a first lens element, a second lens element, a third lens element, a fourth lens element, a fifth lens element, a sixth lens element and a seventh lens element. The fifth lens element with positive refractive power has an object-side surface being concave in a paraxial region thereof and an image-side surface being convex in a paraxial region thereof. The sixth lens element has an object-side surface being convex in a paraxial region thereof and an image-side surface being concave in a paraxial region thereof. The seventh lens element has an object-side surface being convex in a paraxial region thereof and an image-side surface being concave in a paraxial region thereof, and the image-side surface thereof includes at least one convex shape in an off-axis region thereof.

23 Claims, 28 Drawing Sheets

(51) Int. Cl.
*G02B 9/64* (2006.01)
*G02B 7/09* (2021.01)
*G02B 27/64* (2006.01)

(58) Field of Classification Search
USPC ........................................................ 359/708
See application file for complete search history.

(56) References Cited

U.S. PATENT DOCUMENTS

| | | |
|---|---|---|
| 8,736,979 B2 | 5/2014 | Tsai et al. |
| 9,063,318 B2 | 6/2015 | Ishizaka |
| 9,348,113 B2 | 5/2016 | Tang et al. |
| 9,366,845 B2 | 6/2016 | Huang |
| 9,448,386 B2 | 9/2016 | Kubota et al. |
| 9,477,064 B1 | 10/2016 | Chen et al. |
| 9,523,841 B1 | 12/2016 | Chen |
| 9,606,328 B2 | 3/2017 | Chen |
| 9,952,406 B2 | 4/2018 | Jung |
| 10,324,272 B2 | 6/2019 | Huang |
| 10,394,002 B2 | 8/2019 | Huang |
| 2011/0124373 A1 | 5/2011 | Fukuta |
| 2014/0043694 A1 | 2/2014 | Tsai et al. |
| 2014/0211324 A1 | 7/2014 | Ishizaka |
| 2014/0376105 A1 | 12/2014 | Sekine |
| 2015/0009578 A1 | 1/2015 | Shinohara et al. |
| 2015/0070783 A1* | 3/2015 | Hashimoto ............. G02B 9/64 359/708 |
| 2015/0198787 A1 | 7/2015 | Kubota et al. |
| 2015/0198791 A1 | 7/2015 | Kubota et al. |
| 2015/0212298 A1 | 7/2015 | Shinohara et al. |
| 2015/0378131 A1 | 12/2015 | Tang et al. |
| 2016/0033742 A1 | 2/2016 | Huang |
| 2016/0124191 A1 | 5/2016 | Hashimoto |
| 2016/0259152 A1 | 9/2016 | Huang |
| 2016/0282587 A1 | 9/2016 | Hashimoto |
| 2016/0306140 A1 | 10/2016 | Chen |
| 2017/0082834 A1 | 3/2017 | Tang et al. |
| 2017/0219798 A1 | 8/2017 | Park |
| 2018/0106984 A1* | 4/2018 | Tang ..................... G02B 5/208 |
| 2018/0164544 A1 | 6/2018 | Kwak et al. |
| 2018/0196225 A1 | 7/2018 | Chang et al. |
| 2018/0196226 A1 | 7/2018 | Chang et al. |
| 2018/0335608 A1 | 11/2018 | Chang et al. |
| 2018/0335609 A1 | 11/2018 | Chang et al. |

FOREIGN PATENT DOCUMENTS

| | | |
|---|---|---|
| CN | 105278074 A | 1/2016 |
| CN | 105301746 A | 2/2016 |
| CN | 105319680 A | 2/2016 |
| CN | 106646833 A | 5/2017 |
| CN | 106896477 A | 6/2017 |
| CN | 106990510 A | 7/2017 |
| JP | 2003520992 A | 7/2003 |
| TW | 201606342 A | 2/2016 |

* cited by examiner

IMAGE CAPTURING LENS ASSEMBLY, IMAGING APPARATUS AND ELECTRONIC DEVICE

RELATED APPLICATIONS

This application is a continuation of U.S. application Ser. No. 15/797,211, filed Oct. 30, 2017, now U.S. Pat. No. 10,606,035, which claims priority to Taiwan Application Serial Number 106118432, filed Jun. 03, 2017, which is herein incorporated by reference.

BACKGROUND

Technical Field

The present disclosure relates to an image capturing lens assembly and an imaging apparatus. More particularly, the present disclosure relates to an image capturing lens assembly and an imaging apparatus, each of which is featured with an enhanced imaging functionality in an off-axis region and a short total track length and is applicable to electronic devices.

Description of Related Art

With the broadening application of photographing modules, the installation of the photographing modules in various intelligent electronic products, entertainment devices, fitness devices and smart home systems is an upward trend of future technical development. However, with the advance of science and technology, as well as the improved functionality of the electronic products, such as smartphone, the demand of consumers for camera functions is also increasing (such as night photography, photographs of fast motion or depth of focus). It is known that conventional optical lens modules have difficulty satisfying the demands of a large aperture and short total track length simultaneously. Particularly, the result of photographing the off-axis region of an image is highly dictated by the aperture size. Therefore, enhancing the imaging functionality in the off-axis region while maintaining a short total track length, which enables the photographing modules to be applicable to portable electronic devices, is the goal for manufacturers in the industry.

SUMMARY

According to one aspect of the present disclosure, an image capturing lens assembly includes seven lens elements, which are, in order from an object side to an image side, a first lens element, a second lens element, a third lens element, a fourth lens element, a fifth lens element, a sixth lens element and a seventh lens element. The fifth lens element with positive refractive power has an object-side surface being concave in a paraxial region thereof and an image-side surface being convex in a paraxial region thereof. The sixth lens element has an object-side surface being convex in a paraxial region thereof and an image-side surface being concave in a paraxial region thereof, and the object-side surface and the image-side surface of the sixth lens element are aspheric. The seventh lens element has an object-side surface being convex in a paraxial region thereof and an image-side surface being concave in a paraxial region thereof, the image-side surface of the seventh lens element includes at least one convex shape in an off-axis region thereof, and the object-side surface and the image-side surface of the seventh lens element are aspheric. When an axial distance between an object-side surface of the first lens element and an image surface is TL, and an entrance pupil diameter of the image capturing lens assembly is EPD, the following condition is satisfied:

$1.0 < TL/EPD \leq 2.40$.

According to another aspect of the present disclosure, an imaging apparatus includes the image capturing lens assembly according to the aforementioned aspect and an image sensor, wherein the image sensor is disposed on the image surface of the image capturing lens assembly.

According to further another aspect of the present disclosure, an electronic device includes the imaging apparatus according to the aforementioned aspect.

According to yet another aspect of the present disclosure, an image capturing lens assembly includes seven lens elements, which are, in order from an object side to an image side, a first lens element, a second lens element, a third lens element, a fourth lens element, a fifth lens element, a sixth lens element and a seventh lens element. The fifth lens element has positive refractive power. The sixth lens element has an image-side surface being concave in a paraxial region thereof, and an object-side surface and the image-side surface of the sixth lens element are aspheric. The seventh lens element has an object-side surface being convex in a paraxial region thereof and an image-side surface being concave in a paraxial region thereof, the image-side surface of the seventh lens element includes at least one convex shape in an off-axis region thereof, and the object-side surface and the image-side surface of the seventh lens element are aspheric. When an axial distance between an object-side surface of the first lens element and an image surface is TL, and an entrance pupil diameter of the image capturing lens assembly is EPD, the following condition is satisfied:

$1.20 < TL/EPD \leq 2.10$.

According to still another aspect of the present disclosure, an image capturing lens assembly includes seven lens elements, which are, in order from an object side to an image side, a first lens element, a second lens element, a third lens element, a fourth lens element, a fifth lens element, a sixth lens element and a seventh lens element. The sixth lens element has an image-side surface being concave in a paraxial region thereof, and an object-side surface and the image-side surface of the sixth lens element are aspheric. The seventh lens element has an object-side surface being convex in a paraxial region thereof and an image-side surface being concave in a paraxial region thereof, the image-side surface of the seventh lens element includes at least one convex shape in an off-axis region thereof, and the object-side surface and the image-side surface of the seventh lens element are aspheric. When an axial distance between an object-side surface of the first lens element and an image surface is TL, an entrance pupil diameter of the image capturing lens assembly is EPD, an axial distance between the second lens element and the third lens element is T23, and an axial distance between the third lens element and the fourth lens element is T34, the following conditions are satisfied:

$1.0 < TL/EPD \leq 2.10$; and $0 < T23/T34 \leq 0.90$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
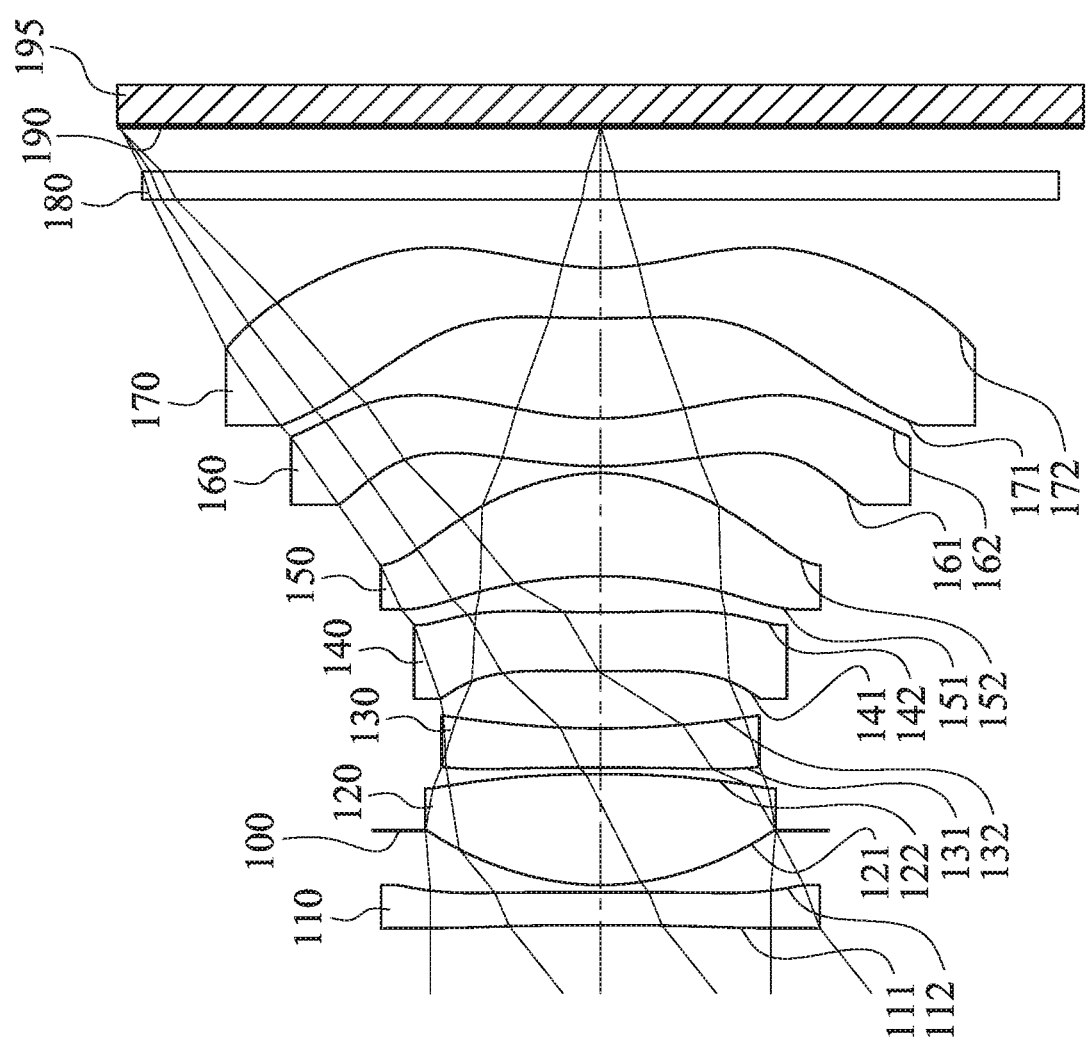
FIG. 1 is a schematic view of an imaging apparatus according to the 1st embodiment of the present disclosure.

An image capturing lens assembly includes seven lens elements, which are, in order from an object side to an image side, a first lens element, a second lens element, a third lens element, a fourth lens element, a fifth lens element, a sixth lens element and a seventh lens element.

The first lens element can have positive refractive power, and can have an object-side surface being convex in a paraxial region thereof. Therefore, the light converging ability at the object side of the image capturing lens assembly can be provided, which is favorable for shortening the total track length of the image capturing lens assembly so as to obtain a compact size.

The fourth lens element can have an object-side surface being concave in a paraxial region thereof. Therefore, it is favorable for correcting aberrations of the image capturing lens assembly.

The fifth lens element can have positive refractive power, and can have an object-side surface being concave in a paraxial region thereof and an image-side surface being convex in a paraxial region thereof. Therefore, the distribution of the positive refractive power of the image capturing lens assembly can be balanced, and the photosensitivity and spherical aberration thereof can be reduced.

The sixth lens element can have an object-side surface being convex in a paraxial region thereof, and has an image-side surface being concave in a paraxial region thereof. Therefore, the principal point of the image capturing lens assembly can be shifted toward the object side, so that the back focal length and the total track length can be shortened effectively.

The seventh lens element has an object-side surface being convex in a paraxial region thereof and an image-side surface being concave in a paraxial region thereof, and the image-side surface of the seventh lens element includes at least one convex shape in an off-axis region thereof. Therefore, the principal point of the image capturing lens assembly can be shifted toward the object side, so that the back focal length and the total track length can be shortened effectively. Moreover, aberrations of the off-axis field can be corrected.

When an axial distance between an object-side surface of the first lens element and an image surface is TL, and an entrance pupil diameter of the image capturing lens assembly is EPD, the following condition is satisfied: $1.0<TL/EPD\leq2.40$. Therefore, the features of large field of view and short total track length can be enhanced, and the brightness in the off-axis region of the image can be increased. Preferably, the following condition can be satisfied: $1.0<TL/EPD\leq2.10$. More preferably, the following condition can be satisfied: $1.20<TL/EPD\leq2.10$. More preferably, the following condition can be satisfied: $1.30<TL/EPD\leq2.0$.

When the axial distance between the object-side surface of the first lens element and the image surface is TL, and a maximum image height of the image capturing lens assembly is ImgH, the following condition can be satisfied: $0.80<TL/ImgH<1.70$. Therefore, the feature of compactness of the image capturing lens assembly can be enhanced.

When an f-number of the image capturing lens assembly is Fno, the following condition can be satisfied:

$1.0<\text{Fno}\le 1.70$. Therefore, the image capturing lens assembly can be featured with a large aperture, and the functionality in depth of field photos can be improved.

When a vertical distance between a maximum effective diameter position on the image-side surface of the seventh lens element and an optical axis is Y72, and the entrance pupil diameter of the image capturing lens assembly is EPD, the following condition can be satisfied: $1.30<2\times Y72/\text{EPD}<2.30$. Therefore, it is favorable for balancing the large field of view and the volume of the image capturing lens assembly, and is favorable for the compactness of the image capturing lens assembly.

When an incident angle of a chief ray at the maximum image height on the image surface of the image capturing lens assembly is CRA1.0Y, the following condition can be satisfied: $32.0 \text{ degrees} \le \text{CRA1.0Y}$. Therefore, it is favorable for the coordination between the image capturing lens assembly and the image sensor, so that the image quality can be enhanced.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and an axial distance between the sixth lens element and the seventh lens element is T67, the following conditions can be satisfied: $1.0<T67/T12$; $1.0<T67/T23$; $1.0<T67/T34$; $1.0<167/T45$; and $1.0<T67/T56$. Therefore, the axial distance between the sixth lens element and the seventh lens element can be enlarged, so that the surface shapes of the sixth lens element and the seventh lens element can be properly arranged, which is favorable for enhancing the image quality in an off-axis region. Preferably, the following conditions can be satisfied: $2.0<T67/T12<50$; $1.25<T67/T23<30$; $1.0<T67/T34<10$; $1.5<T67/T45<15$; and $3.0<T67/T56$. More preferably, the following conditions can be satisfied: $3.0<T67/T12<30$; $1.75<T67/T23<20$; $1.25<T67/T34<5.0$; $2.0<T67/T45<7.5$; and $5.0<T67/T56<100$.

When the axial distance between the second lens element and the third lens element is T23, and the axial distance between the third lens element and the fourth lens element is T34, the following condition can be satisfied: $0<T23/T34 \le 0.90$. Therefore, the poor molding results generated from the excessive curvature of the second lens element and the third lens element can be prevented. Alternatively, the improper refraction of light generated from the excessive curvature in the off-axis region of lens elements can be prevented.

When a focal length of the image capturing lens assembly is f, a curvature radius of the object-side surface of the seventh lens element is R13, and a curvature radius of the image-side surface of the seventh lens element is R14, the following condition can be satisfied: $4.0<(f/R13)+(f/R14)<10.0$. Therefore, the principal point of the image capturing lens assembly can be shifted toward the object side by the arrangement of the seventh lens element, which is favorable for reducing the back focal length.

When the entrance pupil diameter of the image capturing lens assembly is EPD, and the curvature radius of the image-side surface of the seventh lens element is R14, the following condition can be satisfied: $1.50<\text{EPD}/R14<4.0$. Therefore, the principal point of the image capturing lens assembly can be further shifted toward the object side while reducing the back focal length.

When the axial distance between the object-side surface of the first lens element and the image surface is TL, the entrance pupil diameter of the image capturing lens assembly is EPD, and the maximum image height of the image capturing lens assembly is ImgH, the following condition can be satisfied: $2.0<(TL^2)/(EPD\times ImgH)<3.20$. Therefore, the feature of compactness can be further satisfied. Preferably, the following condition can be satisfied: $2.0<(TL^2)/(EPD\times ImgH)\le 3.0$.

When a total number of lens elements having Abbe numbers less than 40 is V40, the following condition can be satisfied: $4\le V40$. Therefore, the ability of the image capturing lens assembly for eliminating chromatic aberration can be improved, and the image quality can be maintained with the large aperture configuration.

When a total number of lens elements having Abbe numbers less than 30 is V30, the following condition can be satisfied: $3\le V30$. Therefore, the ability of the image capturing lens assembly for eliminating chromatic aberration can be further improved.

When a total number of lens elements having Abbe numbers less than 20 is V20, the following condition can be satisfied: $2\le V20$. Therefore, the ability of the image capturing lens assembly for eliminating chromatic aberration can be further improved.

Each of the aforementioned features of the image capturing lens assembly can be utilized in numerous combinations, so as to achieve the corresponding functionality.

According to the image capturing lens assembly of the present disclosure, the lens elements thereof can be made of a plastic material or a glass material. When the lens elements are made of a plastic material, the manufacturing cost can be effectively reduced. When the lens elements are made of a glass material, the arrangement of the refractive power of the image capturing lens assembly may be more flexible to design. Furthermore, surfaces of each lens element can be arranged to be aspheric (ASP), since the aspheric surface of the lens element is easy to form a shape other than spherical surface so as to have more controllable variables for eliminating aberrations thereof, and to further decrease the required number of the lens elements. Therefore, the total track length of the image capturing lens assembly can also be reduced.

According to the image capturing lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the image capturing lens assembly of the present disclosure, the refractive power of a lens element being positive or negative or the focal length of the lens element may refer to the refractive power or the focal length in the paraxial region of the lens element.

According to the image capturing lens assembly of the present disclosure, the image capturing lens assembly can include at least one stop, such as an aperture stop, a glare stop or a field stop. The glare stop or the field stop is for eliminating the stray light and thereby improving the image resolution thereof.

According to the image capturing lens assembly of the present disclosure, the image surface, depending on the corresponding image sensor, can be a planar surface or a curved surface with any curvature, particularly a curved surface being concave toward the object side. According to the image capturing lens assembly of the present disclosure, at least one image correcting element (such as a field flattener) can be selectively disposed between a lens element closest to the image surface and the image surface so as to correct image aberrations (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the image capturing lens assembly of the present disclosure, an aperture stop can be configured as a front stop or a middle stop. A front stop disposed between an imaged object and the first lens element can provide a longer distance between an exit pupil of the image capturing lens assembly and the image surface to enable a telecentric effect, and thereby can improve the image-sensing efficiency of an image sensor. A middle stop disposed between the first lens element and the image surface is favorable for enlarging the field of view of the image capturing lens assembly and thereby provides a wider field of view for the same.

According to the image capturing lens assembly of the present disclosure, the image capturing lens assembly can be applied to 3D (three-dimensional) image capturing applications, in products such as digital cameras, mobile devices, digital tablets, smart TVs, network monitoring devices, motion sensing input devices, driving recorders, rear view camera systems, wearable devices, unmanned aerial vehicles, and other electronic imaging products.

According to the present disclosure, an imaging apparatus is provided. The imaging apparatus includes the aforementioned image capturing lens assembly according to the present disclosure and an image sensor, wherein the image sensor is disposed on or near the image surface of the aforementioned image capturing lens assembly. With the image capturing lens assembly having seven lens elements, the imaging functionality of in an off-axis region can be enhanced, which is more apparent under the configuration of large aperture. With the sixth lens element having an image-side surface being concave in a paraxial region thereof and the seventh lens element having an image-side surface being concave in a paraxial region thereof, the principal point of the image capturing lens assembly can be shifted toward the object side, so that the back focal length and the total track length can be shortened effectively. Accordingly, the image capturing lens assembly and the imaging apparatus according to the present disclosure become applicable to portable electronic devices. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Preferably, the electronic device can further include, but not limited to, a control unit, a display, a storage unit, a random access memory unit (RAM) or a combination thereof.

According to the above description of the present disclosure, the following 1st-14th specific embodiments are provided for further explanation.

1st Embodiment

Figure 2:
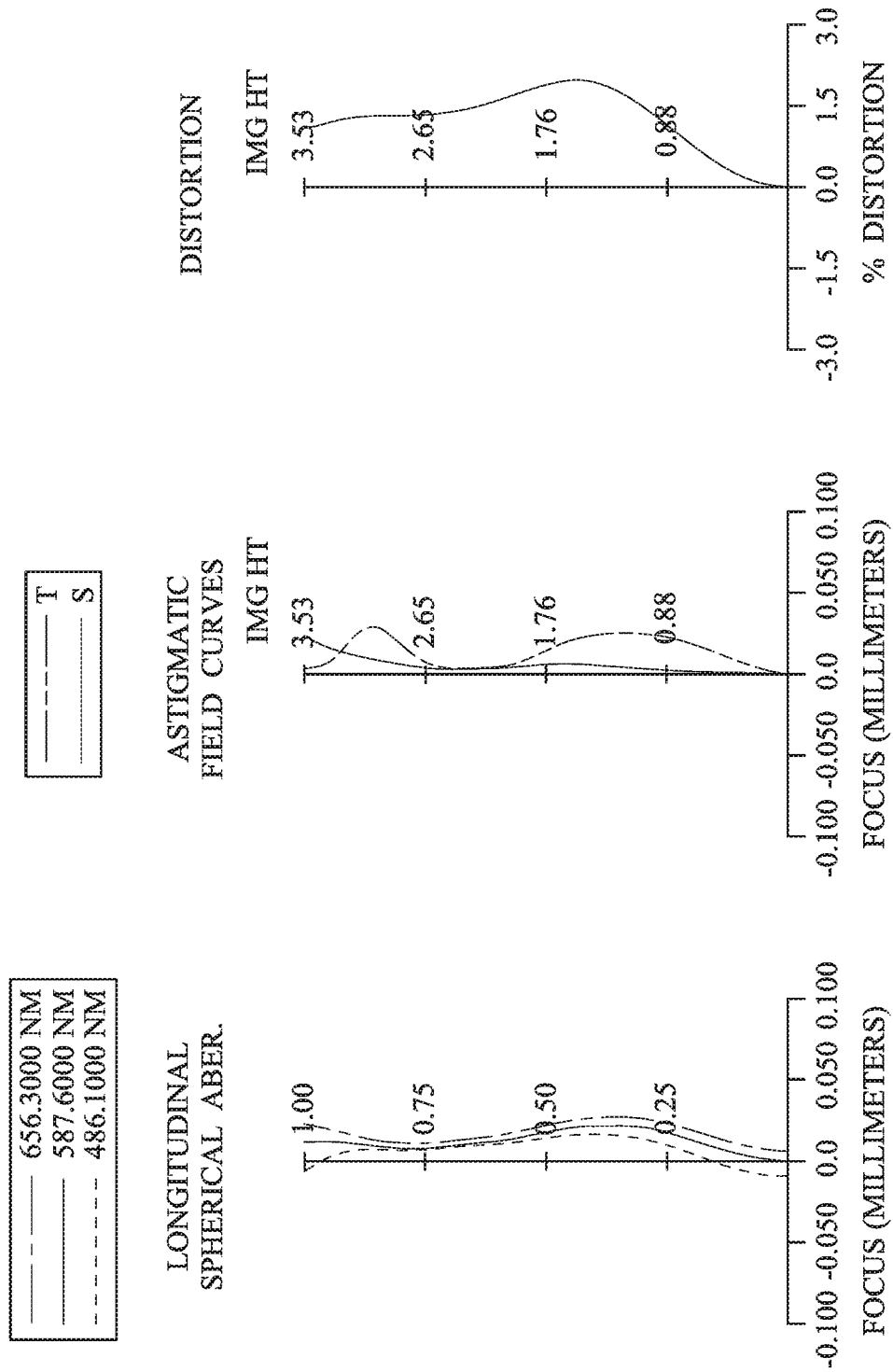
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an image capturing lens assembly (its reference numeral is omitted) and an image sensor 195. The image capturing lens assembly includes, in order from an object side to an image side, a first lens element 110, an aperture stop 100, a second lens element 120, a third lens element 130, a fourth lens element 140, a fifth lens element 150, a sixth lens element 160, a seventh lens element 170, an IR-cut filter 180 and an image surface 190. The image sensor 195 is disposed on the image surface 190 of the image capturing lens assembly. The image capturing lens assembly includes seven lens elements (110, 120, 130, 140, 150, 160 and 170) without additional one or more lens elements inserted between the first lens element 110 and the seventh lens element 170.

The first lens element 110 with negative refractive power has an object-side surface 111 being concave in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of a plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric.

The seventh lens element 170 with negative refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Moreover, the image-side surface 172 of the seventh lens element 170 includes at least one convex shape in an off-axis region thereof.

The IR-cut filter 180 is made of a glass material and located between the seventh lens element 170 and the image surface 190, and will not affect the focal length of the image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing lens assembly according to the 1st embodiment, when a focal length of the image capturing lens assembly is f, an f-number of the image capturing lens assembly is Fno, and half of a maximum field of view of the image capturing lens assembly is HFOV, these parameters have the following values: f=4.36 mm; Fno=1.75; and HFOV=38.6 degrees.

Figure 21:
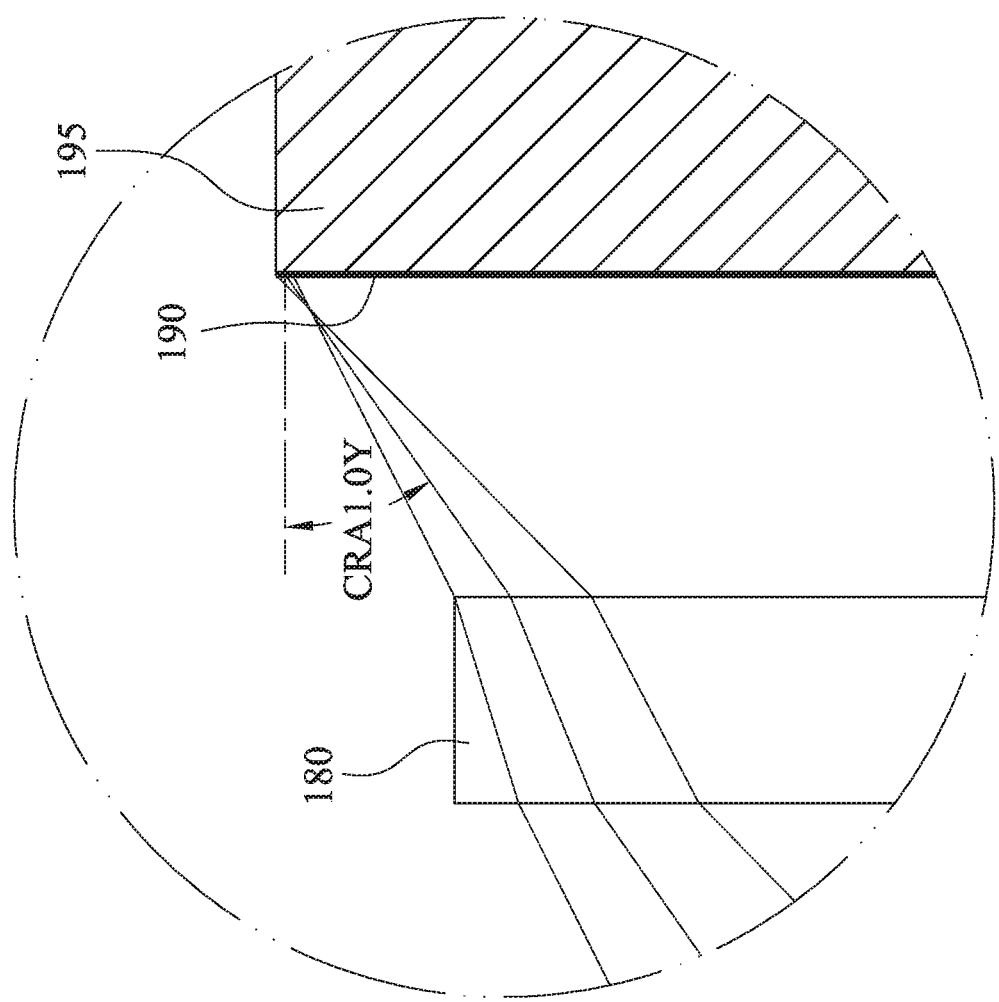
FIG. 21 is a schematic view showing a parameter of CRA1.0Y of the imaging apparatus according to the 1st embodiment in FIG. 1.

FIG. 21 is a schematic view showing a parameter of CRA1.0Y of the imaging apparatus according to the 1st embodiment in FIG. 1. As shown in FIG. 21, when an incident angle of a chief ray at a maximum image height on the image surface 190 of the image capturing lens assembly is CRA1.0Y, the following condition is satisfied: CRA1.0Y=34.9 degrees.

In the image capturing lens assembly according to the 1st embodiment, when a total number of lens elements having Abbe numbers less than 40 is V40, the following condition is satisfied: V40=4. Specifically, in the image capturing lens assembly according to the 1st embodiment, the lens elements having Abbe numbers less than 40 are the first lens element 110 (Abbe number=26.0), the third lens element 130 (Abbe number=26.0), the fourth lens element 140 (Abbe number=21.5) and the sixth lens element 160 (Abbe number=23.5).

In the image capturing lens assembly according to the 1st embodiment, when a total number of lens elements having Abbe numbers less than 30 is V30, the following condition is satisfied: V30=4. Specifically, in the image capturing lens assembly according to the 1st embodiment, the lens elements having Abbe numbers less than 30 are the first lens element 110 (Abbe number=26.0), the third lens element 130 (Abbe number=26.0), the fourth lens element 140 (Abbe number=21.5) and the sixth lens element 160 (Abbe number=23.5).

In the image capturing lens assembly according to the 1st embodiment, when a total number of lens elements having Abbe numbers less than 20 is V20, the following condition is satisfied: V20=0. Specifically, in the image capturing lens assembly according to the 1st embodiment, each of the first lens element 110 (Abbe number=26.0), the second lens element 120 (Abbe number=56.0), the third lens element 130 (Abbe number=26.0), the fourth lens element 140 (Abbe number=21.5), the fifth lens element 150 (Abbe number=56.0), the sixth lens element 160 (Abbe number=23.5) and the seventh lens element 170 (Abbe number=56.0) has an Abbe number greater than 20.

In the image capturing lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, and an axial distance between the sixth lens element 160 and the seventh lens element 170 is T67, the following conditions are satisfied: T23/T34=0.12; T67/T12=13.83; T67/T23=14.66; T67/T34=1.75; T67/T45=2.77; and T67/T56=14.66.

In the image capturing lens assembly according to the 1st embodiment, when an axial distance between the object-side surface 111 of the first lens element 110 and the image surface 190 is TL, an entrance pupil diameter of the image capturing lens assembly is EPD, and the maximum image height of the image capturing lens assembly is ImgH (half of a diagonal length of an effective photosensitive area of the image sensor 195), the following conditions are satisfied: TL/EPD=2.35; TL/ImgH=1.66; and $(TL^2)/(EPD \times ImgH)=3.90$.

In the image capturing lens assembly according to the 1st embodiment, when the entrance pupil diameter of the image capturing lens assembly is EPD, and a curvature radius of the image-side surface 172 of the seventh lens element 170 is R14, the following condition is satisfied: EPD/R14=1.36.

Figure 22:
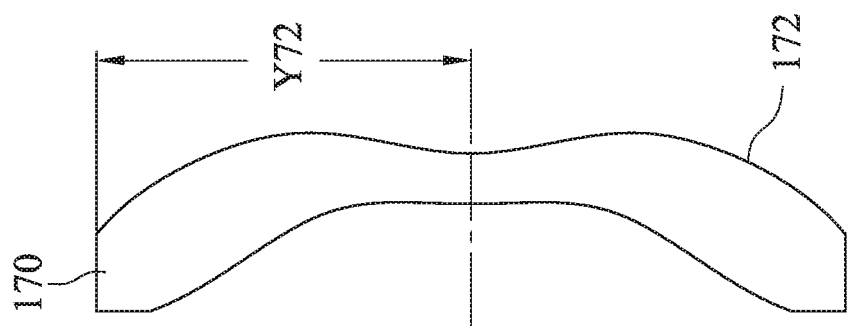
FIG. 22 is a schematic view showing a parameter of Y72 of the imaging apparatus according to the 1st embodiment in FIG. 1.

FIG. 22 is a schematic view showing a parameter of Y72 of the imaging apparatus according to the 1st embodiment in FIG. 1. As shown in FIG. 22, when a vertical distance between a maximum effective diameter position on the image-side surface 172 of the seventh lens element 170 and the optical axis is Y72, and the entrance pupil diameter of the image capturing lens assembly is EPD, the following condition is satisfied: 2×Y72/EPD=2.20.

In the image capturing lens assembly according to the 1st embodiment, when the focal length of the image capturing lens assembly is f, a curvature radius of the object-side surface 171 of the seventh lens element 170 is R13, and the curvature radius of the image-side surface 172 of the seventh lens element 170 is R14, the following condition is satisfied: (f/R13)+(f/R14)=3.07.

The detailed optical data of the 1st embodiment are shown in TABLE 1 and the aspheric surface data are shown in TABLE 2 below.

TABLE 1

1st Embodiment
f = 4.36 mm, Fno = 1.75, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −33.630 | ASP | 0.240 | Plastic | 1.614 | 26.0 | −37.61 |
| 2 | | 73.790 | ASP | 0.454 | | | | |
| 3 | Ape. Stop | Plano | | −0.401 | | | | |
| 4 | Lens 2 | 1.987 | ASP | 0.812 | Plastic | 1.544 | 56.0 | 3.39 |
| 5 | | −22.270 | ASP | 0.050 | | | | |
| 6 | Lens 3 | 146.754 | ASP | 0.286 | Plastic | 1.614 | 26.0 | −10.17 |

TABLE 1-continued

1st Embodiment
f = 4.36 mm, Fno = 1.75, HFOV = 38.6 deg.

| Surface # | | Curvature Radius | | Thickness | Material | Index | Abbe # | Focal Length |
|---|---|---|---|---|---|---|---|---|
| 7 | | 5.983 | ASP | 0.420 | | | | |
| 8 | Lens 4 | 12.570 | ASP | 0.431 | Plastic | 1.650 | 21.5 | −34.39 |
| 9 | | 7.939 | ASP | 0.265 | | | | |
| 10 | Lens 5 | −3.576 | ASP | 0.757 | Plastic | 1.544 | 56.0 | 3.99 |
| 11 | | −1.452 | ASP | 0.050 | | | | |
| 12 | Lens 6 | 3.349 | ASP | 0.350 | Plastic | 1.639 | 23.5 | −12.11 |
| 13 | | 2.242 | ASP | 0.733 | | | | |
| 14 | Lens 7 | 6.228 | ASP | 0.370 | Plastic | 1.544 | 56.0 | −4.94 |
| 15 | | 1.838 | ASP | 0.500 | | | | |
| 16 | IR-cut filter | Plano | | 0.210 | Glass | 1.517 | 64.2 | — |
| 17 | | Plano | | 0.328 | | | | |
| 18 | Image | Plano | | — | | | | |

Reference wavelength is 587.6 nm (d-line).
The effective radius of the surface 7 is 1.150 mm.

TABLE 2

Aspheric Coefficients

| Surface # | 1 | 2 | 4 | 5 | 6 | 7 | 8 |
|---|---|---|---|---|---|---|---|
| k = | 1.3483E+01 | 5.6949E+01 | −2.9566E−01 | −1.0000E+00 | −9.0000E+01 | −7.5095E+01 | −8.0848E+01 |
| A4 = | −3.7828E−03 | −3.7066E−02 | −4.1674E−02 | −1.0459E−01 | −1.1790E−01 | −1.9239E−02 | −1.5640E−01 |
| A6 = | −1.5998E−02 | 2.4347E−02 | 3.6732E−02 | 8.1805E−02 | 1.7205E−01 | 8.3617E−02 | 1.6286E−01 |
| A8 = | 2.6880E−02 | 8.7162E−03 | −2.3112E−02 | 1.0052E−02 | −4.9012E−02 | −8.3411E−02 | −4.5355E−01 |
| A10 = | −1.4272E−02 | −9.9692E−03 | 9.1558E−03 | −6.2670E−02 | −5.6396E−02 | 6.0572E−02 | 7.1451E−01 |
| A12 = | 3.5159E−03 | 3.8310E−03 | −1.6636E−03 | 4.0853E−02 | 4.9735E−02 | −4.3838E−02 | −6.4976E−01 |
| A14 = | −3.7281E−04 | −6.7041E−04 | | −8.6984E−03 | −1.1230E−02 | 1.4752E−02 | 3.0088E−01 |
| A16 = | | | | | | | −5.2769E−02 |

| Surface # | 9 | 10 | 11 | 12 | 13 | 14 | 15 |
|---|---|---|---|---|---|---|---|
| k = | −1.7616E+01 | −4.3378E+00 | −1.0924E+00 | 1.0170E+00 | −1.1621E+00 | −2.2775E+00 | −9.8730E−01 |
| A4 = | −1.1679E−01 | −4.0101E−02 | 4.4007E−02 | −5.2206E−02 | −9.5410E−02 | −1.4295E−01 | −1.7644E−01 |
| A6 = | 1.1778E−01 | 8.8954E−02 | −5.2955E−02 | −2.2722E−02 | 1.9234E−02 | 2.4666E−03 | 5.9200E−02 |
| A8 = | −2.1121E−01 | −1.1389E−01 | 5.6194E−02 | 2.1008E−02 | −4.9241E−04 | 1.8582E−02 | −1.6343E−02 |
| A10 = | 2.3045E−01 | 6.2652E−02 | −4.4095E−02 | −1.1658E−02 | −2.6120E−03 | −6.3756E−03 | 3.2704E−03 |
| A12 = | −1.4895E−01 | −1.1347E−02 | 1.9102E−02 | 2.8249E−03 | 1.0030E−03 | 9.9766E−04 | −4.0929E−04 |
| A14 = | 5.3730E−02 | | −3.3225E−03 | −2.3423E−04 | −1.4591E−04 | −7.8320E−05 | 2.7669E−05 |
| A16 = | −7.8451E−03 | | 1.2685E−04 | | 7.6330E−06 | 2.5034E−06 | −7.6699E−07 |

In TABLE 1, the curvature radius, the thickness and the focal length are shown in millimeters (mm). Surface numbers 0-18 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
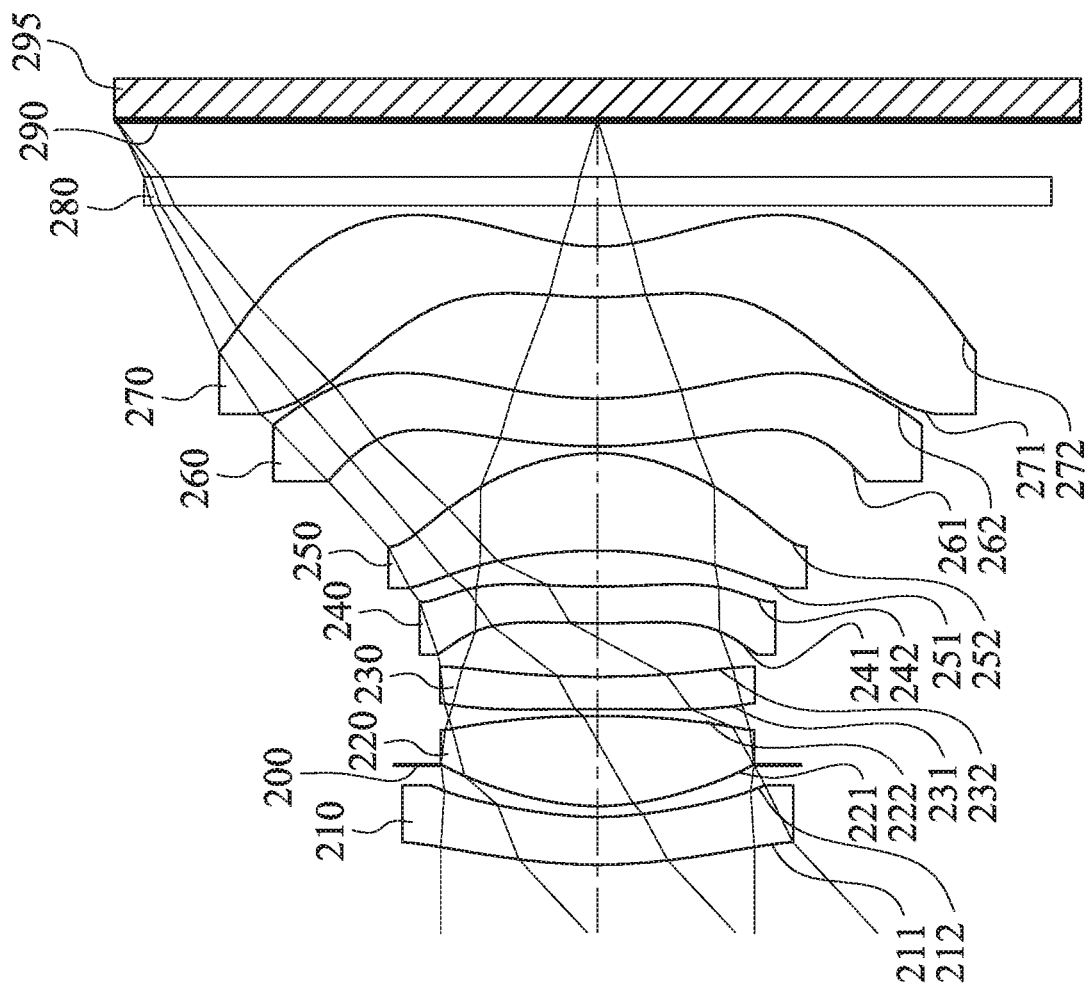
FIG. 3 is a schematic view of an imaging apparatus according to the 2nd embodiment of the present disclosure.
Figure 4:
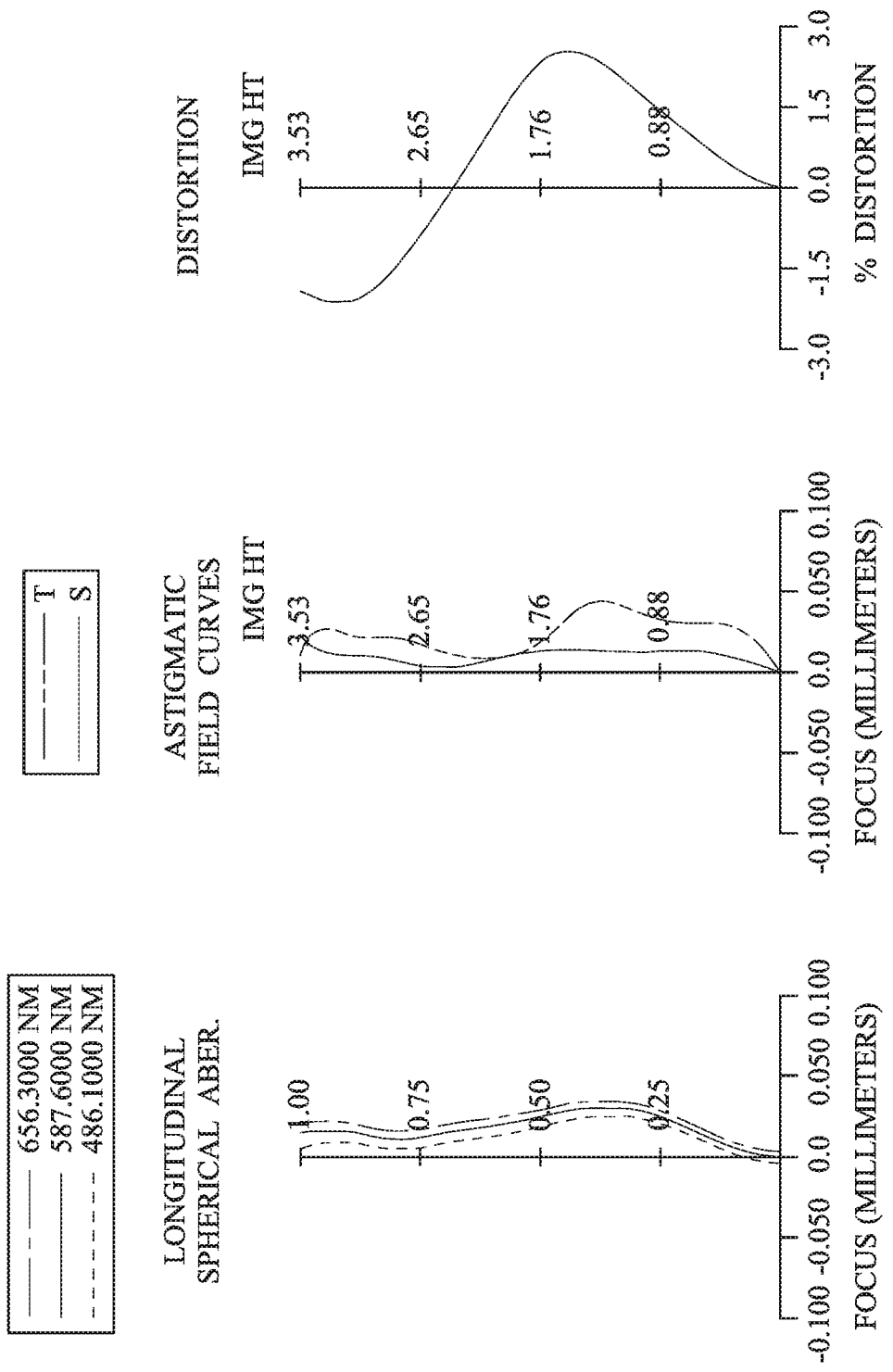
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an image capturing assembly (its reference numeral is omitted) and an image sensor 295. The image capturing lens assembly includes, in order from an object side to an image side, a first lens element 210, an aperture stop 200, a second lens element 220, a third lens element 230, a fourth lens element 240, a fifth lens element 250, a sixth lens element 260, a seventh lens element 270, an IR-cut filter 280 and an image surface 290. The image sensor 295 is disposed on the image surface 290 of the image capturing lens assembly. The image capturing lens assembly includes seven lens elements (210, 220, 230, 240, 250, 260 and 270) without additional one or more lens elements inserted between the first lens element 210 and the seventh lens element 270.

The first lens element 210 with negative refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of a plastic material, and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Moreover, the image-side surface 272 of the seventh lens element 270 includes at least one convex shape in an off-axis region thereof.

The IR-cut filter 280 is made of a glass material and located between the seventh lens element 270 and the image surface 290, and will not affect the focal length of the image capturing lens assembly.

The detailed optical data of the 2nd embodiment are shown in TABLE 3 and the aspheric surface data are shown in TABLE 4 below.

TABLE 3

2nd Embodiment
f = 3.85 mm, Fno = 1.68, HFOV = 43.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.779 | ASP | 0.350 | Plastic | 1.603 | 28.5 | −11.44 |
| 2 | | 2.356 | ASP | 0.379 | | | | |
| 3 | Ape. Stop | Plano | | −0.300 | | | | |
| 4 | Lens 2 | 1.751 | ASP | 0.660 | Plastic | 1.544 | 55.9 | 2.72 |
| 5 | | −8.227 | ASP | 0.050 | | | | |
| 6 | Lens 3 | −95.285 | ASP | 0.236 | Plastic | 1.584 | 28.2 | −10.29 |
| 7 | | 6.421 | ASP | 0.392 | | | | |
| 8 | Lens 4 | 6.655 | ASP | 0.268 | Plastic | 1.669 | 19.5 | −31.38 |
| 9 | | 4.972 | ASP | 0.262 | | | | |
| 10 | Lens 5 | −4.111 | ASP | 0.714 | Plastic | 1.544 | 55.9 | 4.05 |
| 11 | | −1.522 | ASP | 0.050 | | | | |
| 12 | Lens 6 | 3.687 | ASP | 0.350 | Plastic | 1.669 | 19.5 | −24.03 |
| 13 | | 2.885 | ASP | 0.741 | | | | |
| 14 | Lens 7 | 3.321 | ASP | 0.370 | Plastic | 1.544 | 55.9 | −4.59 |
| 15 | | 1.370 | ASP | 0.300 | | | | |
| 16 | IR-cut filter | Plano | | 0.210 | Glass | 1.517 | 64.2 | — |
| 17 | | Plano | | 0.416 | | | | |
| 18 | Image | Plano | | — | | | | |

Reference wavelength is 587.6 nm (d-line).
The effective radius of the surface 7 is 1.150 mm.

TABLE 4

Aspheric Coefficients

| Surface # | 1 | 2 | 4 | 5 | 6 | 7 | 8 |
|---|---|---|---|---|---|---|---|
| k = | −1.1832E−02 | −2.8460E+00 | −1.2663E+00 | −8.5581E+01 | 9.0000E+01 | −6.7906E+01 | −8.5892E+01 |
| A4 = | −4.1736E−02 | −1.2985E−01 | −1.1033E−01 | −7.7399E−02 | −5.2046E−02 | −2.0490E−02 | −1.8744E−01 |
| A6 = | 1.8169E−02 | 1.2839E−01 | 1.0797E−01 | 9.3741E−02 | 1.7952E−01 | 1.1868E−01 | 2.3088E−01 |
| A8 = | −1.1329E−02 | −6.5451E−02 | −8.0246E−02 | −8.4426E−02 | −1.5553E−01 | −1.8256E−01 | −7.5285E−01 |
| A10 = | 7.2727E−03 | 1.8842E−02 | 4.6488E−02 | 3.0745E−02 | 5.4456E−02 | 1.6948E−01 | 1.2464E+00 |
| A12 = | −2.9688E−03 | 6.2100E−03 | −1.0580E−02 | 9.5701E−03 | 1.0034E−02 | −1.0509E−01 | −1.1716E+00 |
| A14 = | 3.8863E−04 | −4.5619E−03 | | −6.6896E−03 | −9.5752E−03 | 2.7778E−02 | 5.7318E−01 |
| A16 = | | | | | | | −1.0891E−01 |

| Surface # | 9 | 10 | 11 | 12 | 13 | 14 | 15 |
|---|---|---|---|---|---|---|---|
| k = | −5.6703E+00 | −4.1083E+00 | −9.0339E−01 | −7.6196E+01 | −6.3738E−02 | −1.4319E+00 | −2.6409E+00 |
| A4 = | −1.8476E−01 | −9.5215E−02 | −8.4679E−02 | 8.3328E−02 | −3.4205E−02 | −2.0385E−01 | −1.6552E−01 |

TABLE 4-continued

Aspheric Coefficients

| A6 = | 2.2204E−01 | 1.9771E−01 | 2.5379E−01 | −8.4535E−02 | −1.1016E−02 | 5.4134E−02 | 7.9844E−02 |
| A8 = | −4.3750E−01 | −2.3022E−01 | −3.7070E−01 | 3.4577E−02 | 4.5891E−03 | −1.1112E−02 | −2.7876E−02 |
| A10 = | 5.0265E−01 | 1.1735E−01 | 3.1428E−01 | −9.1535E−03 | −1.4026E−03 | 2.5722E−03 | 5.9289E−03 |
| A12 = | −3.4037E−01 | −2.0755E−02 | −1.5951E−01 | 1.2269E−03 | 2.9046E−04 | −4.2594E−04 | −7.2720E−04 |
| A14 = | 1.2956E−01 | | 4.4924E−02 | −5.5112E−05 | −3.0929E−05 | 3.6843E−05 | 4.6554E−05 |
| A16 = | −2.0234E−02 | | −5.2191E−03 | | 1.2453E−06 | −1.2511E−06 | −1.1769E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 3.85 | T67/T34 | 1.89 |
| Fno | 1.68 | T67/T45 | 2.83 |
| HFOV (deg.) | 43.0 | T67/T56 | 14.82 |
| CRA1.0Y (deg.) | 31.9 | TL/EPD | 2.38 |
| V40 | 4 | TL/ImgH | 1.54 |
| V30 | 4 | (TL$^2$)/(EPD × ImgH) | 3.67 |
| V20 | 2 | EPD/R14 | 1.67 |
| T23/T34 | 0.13 | 2 × Y72/EPD | 2.41 |
| T67/T12 | 9.38 | f/R13 + f/R14 | 3.97 |
| T67/T23 | 14.82 | | |

3rd Embodiment

Figure 5:
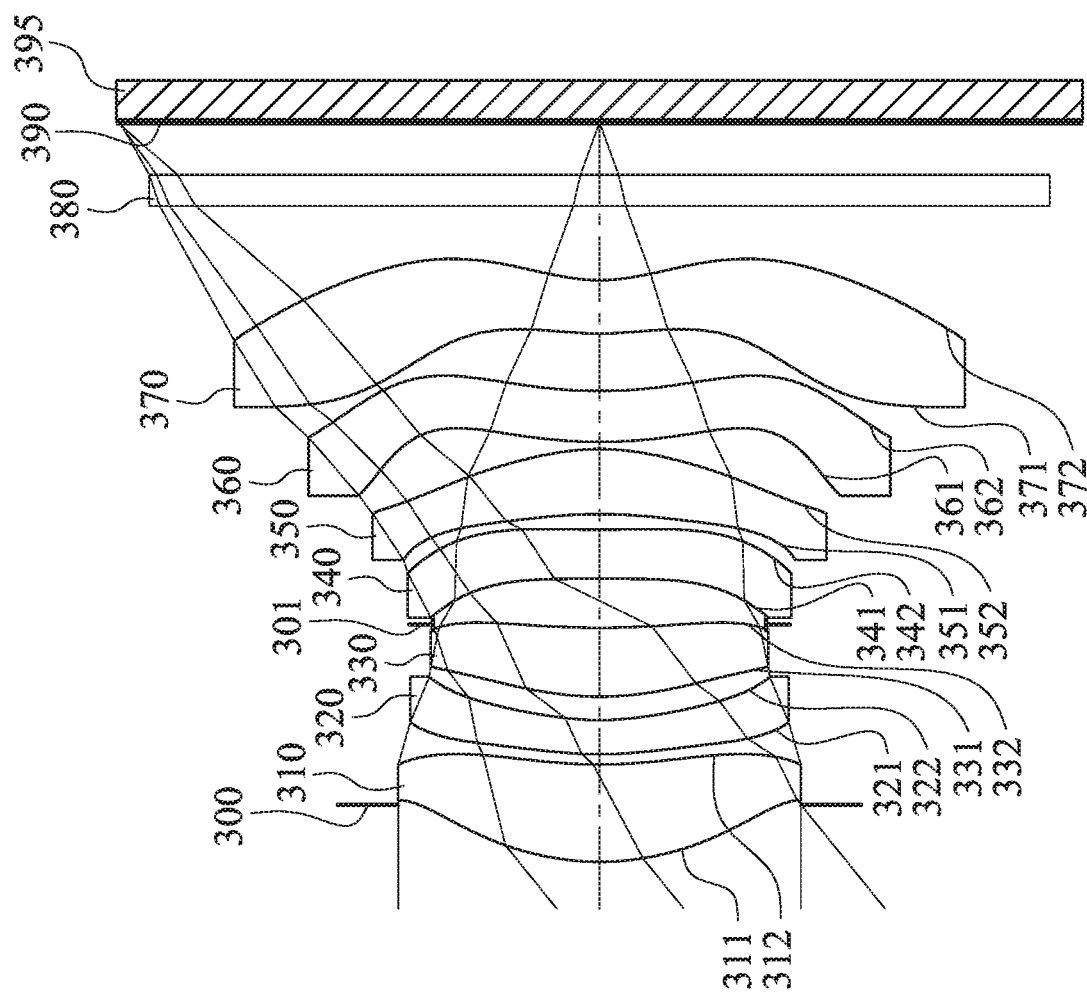
FIG. 5 is a schematic view of an imaging apparatus according to the 3rd embodiment of the present disclosure.
Figure 6:
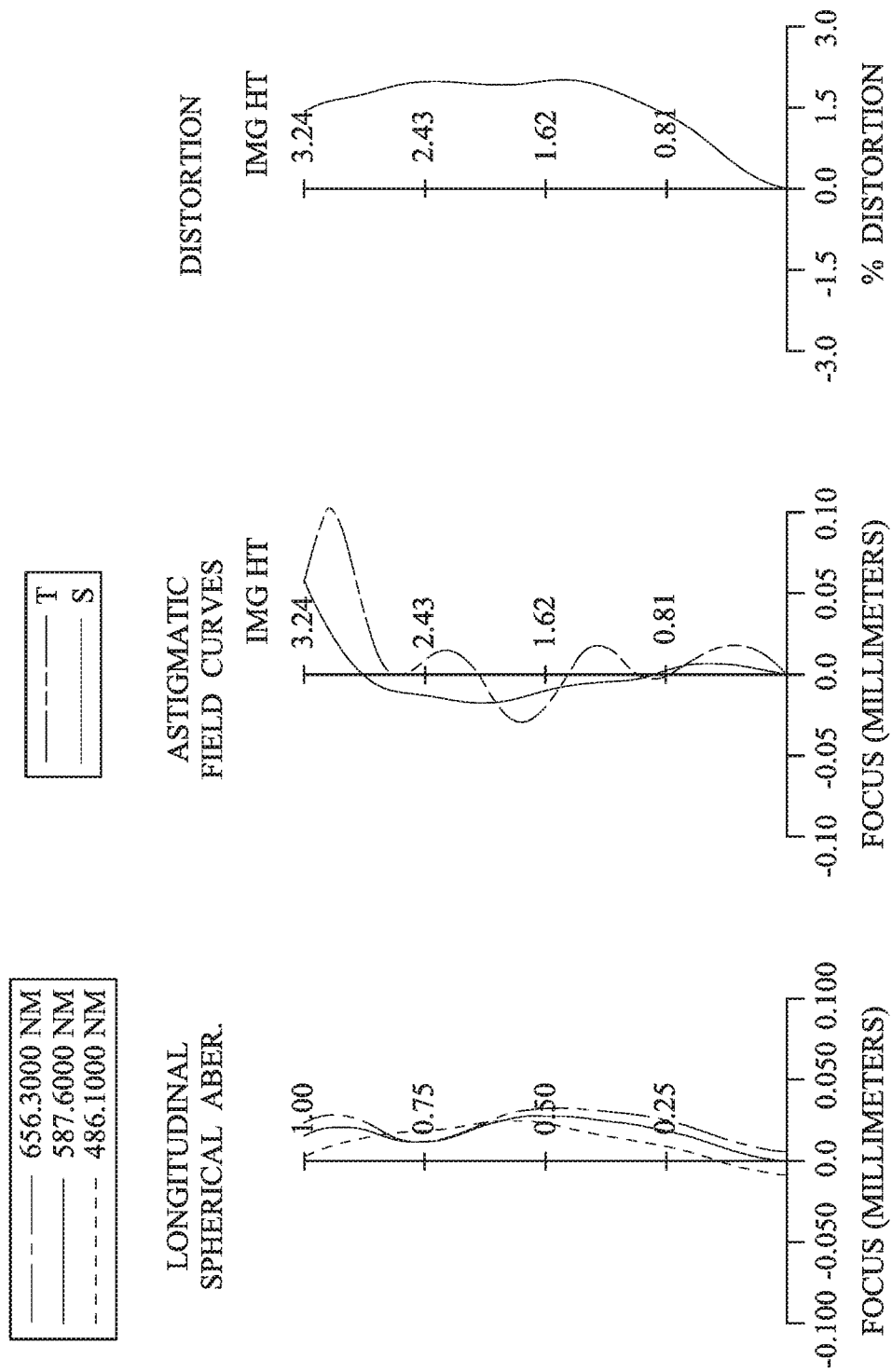
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an image capturing lens assembly (its reference numeral is omitted) and an image sensor 395. The image capturing lens assembly includes, in order from an object side to an image side, an aperture stop 300, a first lens element 310, a second lens element 320, a third lens element 330, a stop 301, a fourth lens element 340, a fifth lens element 350, a sixth lens element 360, a seventh lens element 370, an IR-cut filter 380 and an image surface 390. The image sensor 395 is disposed on the image surface 390 of the image capturing lens assembly. The image capturing lens assembly includes seven lens elements (310, 320, 330, 340, 350, 360 and 370) without additional one or more lens elements inserted between the first lens element 310 and the seventh lens element 370.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric.

The seventh lens element 370 with negative refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric. Moreover, the image-side surface 372 of the seventh lens element 370 includes at least one convex shape in an off-axis region thereof.

The IR-cut filter 380 is made of a glass material and located between the seventh lens element 370 and the image surface 390, and will not affect the focal length of the image capturing lens assembly.

The detailed optical data of the 3rd embodiment are shown in TABLE 5 and the aspheric surface data are shown in TABLE 6 below.

TABLE 5

3rd Embodiment
f = 3.93 mm, Fno = 1.45, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.385 | | | | |
| 2 | Lens 1 | 1.831 | ASP | 0.656 | Plastic | 1.545 | 56.0 | 6.49 |
| 3 | | 3.321 | ASP | 0.069 | | | | |
| 4 | Lens 2 | 2.725 | ASP | 0.230 | Plastic | 1.671 | 19.5 | −11.54 |
| 5 | | 1.947 | ASP | 0.157 | | | | |
| 6 | Lens 3 | 2.066 | ASP | 0.464 | Plastic | 1.544 | 56.0 | 5.63 |
| 7 | | 5.839 | ASP | 0.022 | | | | |
| 8 | Stop | Plano | | 0.308 | | | | |
| 9 | Lens 4 | −200.000 | ASP | 0.331 | Plastic | 1.671 | 19.5 | −14.11 |
| 10 | | 9.942 | ASP | 0.103 | | | | |
| 11 | Lens 5 | −4.251 | ASP | 0.439 | Plastic | 1.544 | 56.0 | 4.59 |
| 12 | | −1.631 | ASP | 0.050 | | | | |
| 13 | Lens 6 | 4.561 | ASP | 0.342 | Plastic | 1.671 | 19.5 | −26.37 |
| 14 | | 3.517 | ASP | 0.385 | | | | |
| 15 | Lens 7 | 2.220 | ASP | 0.360 | Plastic | 1.544 | 56.0 | −5.32 |
| 16 | | 1.184 | ASP | 0.500 | | | | |
| 17 | IR-cut filter | Plano | | 0.210 | Glass | 1.517 | 64.2 | — |
| 18 | | Plano | | 0.357 | | | | |
| 19 | Image | Plano | | — | | | | |

Reference wavelength is 587.6 nm (d-line).
The effective radius of the surface 8 is 1.120 mm.

TABLE 6

Aspheric Coefficients

| Surface # | 2 | 3 | 4 | 5 | 6 | 7 | 9 |
|---|---|---|---|---|---|---|---|
| k = | −1.6163E−01 | −2.0738E+00 | −2.8201E+01 | −1.1493E+01 | −9.3281E+00 | 9.7527E+00 | 7.9638E+01 |
| A4 = | −4.0064E−03 | −5.1562E−02 | 1.5588E−02 | 7.7222E−03 | 4.9275E−02 | −3.1363E−02 | −1.7890E−01 |
| A6 = | 4.9611E−03 | −7.4285E−02 | −1.8317E−01 | −7.3507E−02 | −1.0971E−01 | −2.5699E−02 | 8.5434E−02 |
| A8 = | −2.8885E−02 | 7.7688E−02 | 3.0353E−01 | 1.8107E−01 | 1.1549E−01 | −1.0024E−02 | −2.3749E−01 |
| A10 = | 3.0769E−02 | −3.4539E−02 | −2.1953E−01 | −1.2866E−01 | −8.9566E−02 | −1.4398E−02 | 3.0298E−01 |
| A12 = | −2.1166E−02 | 5.3315E−03 | 8.8189E−02 | 3.6529E−02 | 2.0915E−02 | 1.0149E−02 | −1.3981E−01 |
| A14 = | 4.5109E−03 | | −1.5311E−02 | 1.3780E−03 | 7.3782E−03 | | −7.1273E−03 |
| A16 = | | | | | | | 1.5042E−02 |

| Surface # | 10 | 11 | 12 | 13 | 14 | 15 | 16 |
|---|---|---|---|---|---|---|---|
| k = | 5.3352E+01 | 9.0120E+00 | −1.5865E+00 | 1.2182E+00 | −6.2708E+00 | −1.1859E+01 | −5.2863E+00 |
| A4 = | −3.4223E−01 | −2.6215E−01 | 1.6853E−01 | 2.3436E−01 | 7.5220E−02 | −3.7524E−01 | −2.4278E−01 |
| A6 = | 9.4020E−01 | 1.4875E+00 | −2.9006E−01 | −6.2355E−01 | −1.9860E−01 | 2.6902E−01 | 1.8159E−01 |
| A8 = | −2.0272E+00 | −3.0293E+00 | 3.9149E−01 | 7.3043E−01 | 1.4789E−01 | −2.0915E−01 | −1.1540E−01 |
| A10 = | 2.2808E+00 | 3.2050E+00 | −3.5355E−01 | −5.9388E−01 | −7.0411E−02 | 1.3967E−01 | 5.4021E−02 |
| A12 = | −1.3712E+00 | −1.8613E+00 | 1.8770E−01 | 3.2195E−01 | 2.0537E−02 | −5.9221E−02 | −1.6841E−02 |
| A14 = | 4.1306E−01 | 5.5797E−01 | −5.1124E−02 | −1.1327E−01 | −3.1935E−03 | 1.5325E−02 | 3.3678E−03 |
| A16 = | −4.8394E−02 | −6.7223E−02 | 5.4433E−03 | 2.3361E−02 | 2.0117E−04 | −2.3800E−03 | −4.1595E−04 |
| A18 = | | | | −2.0944E−03 | | 2.0525E−04 | 2.9004E−05 |
| A20 = | | | | | | −7.5976E−06 | −8.7710E−07 |

In the 3rd embodiment, the equation of the aspheric surface profiles of the aforementioned lens elements is the same as the equation of the 1st embodiment. A4-A20 represent the aspheric coefficients ranging from the 4th order to the 20th order. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 3.93 | T67/T34 | 1.17 |
| Fno | 1.45 | T67/T45 | 3.74 |
| HFOV (deg.) | 39.0 | T67/T56 | 7.70 |
| CRA1.0Y (deg.) | 35.9 | TL/EPD | 1.84 |
| V40 | 3 | TL/ImgH | 1.54 |
| V30 | 3 | $(TL^2)/(EPD \times ImgH)$ | 2.83 |
| V20 | 3 | EPD/R14 | 2.29 |
| T23/T34 | 0.48 | $2 \times Y72/EPD$ | 1.81 |
| T67/T12 | 5.58 | f/R13 + f/R14 | 5.09 |
| T67/T23 | 2.45 | | |

4th Embodiment

Figure 7:
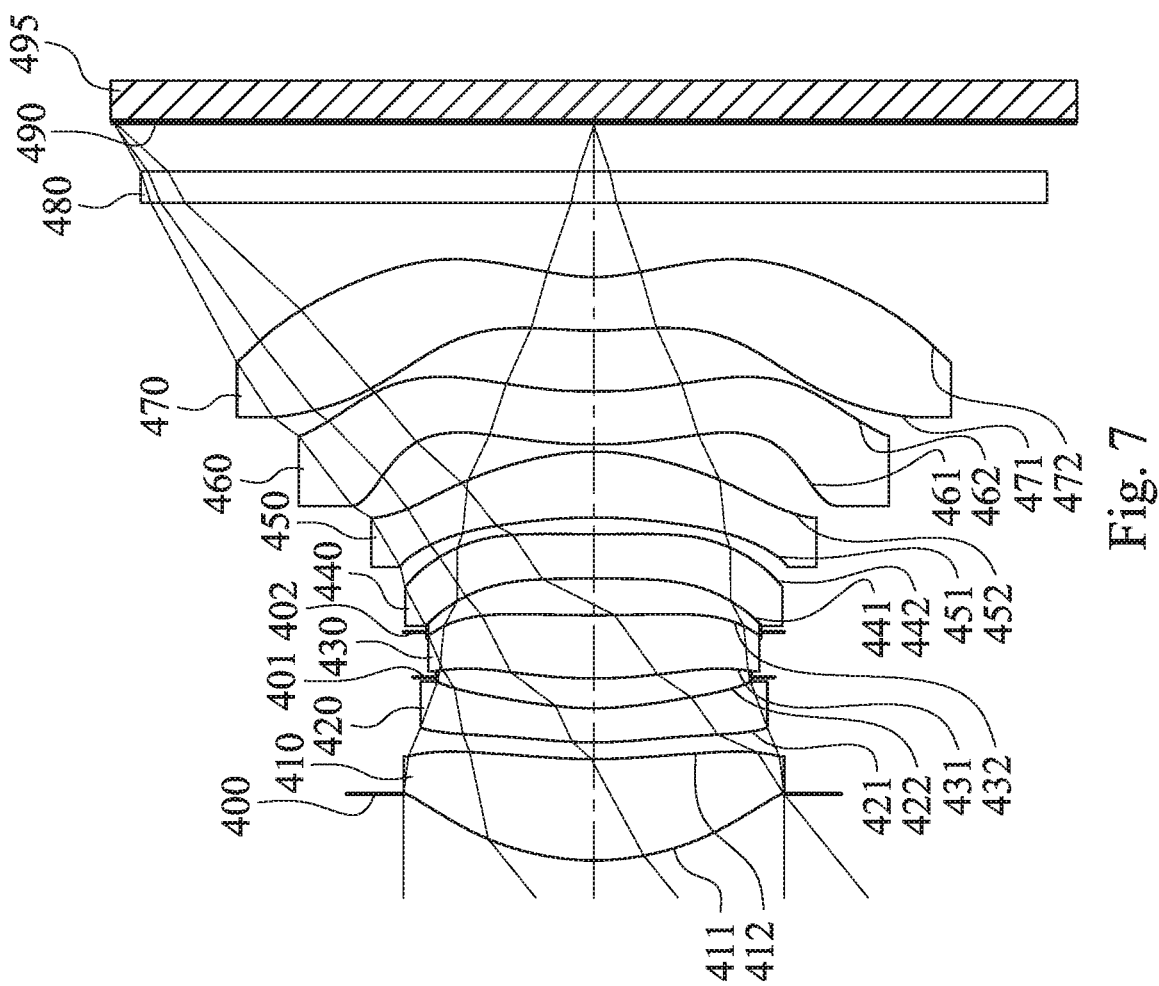
FIG. 7 is a schematic view of an imaging apparatus according to the 4th embodiment of the present disclosure.
Figure 8:
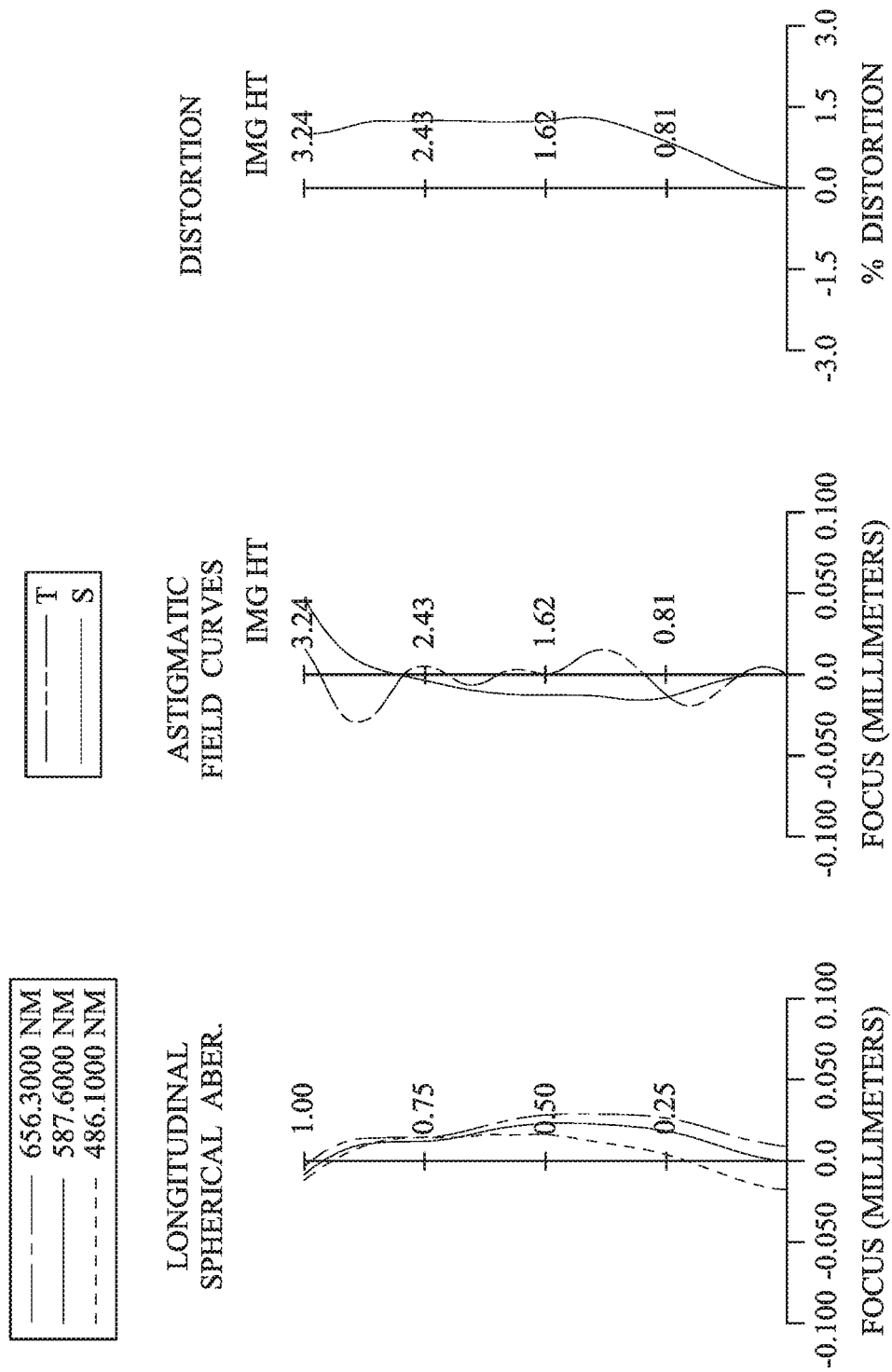
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an image capturing lens assembly (its reference numeral is omitted) and an image sensor 495. The image capturing lens assembly includes, in order from an object side to an image side, an aperture stop 400, a first lens element 410, a second lens element 420, a stop 401, a third lens element 430, a stop 402, a fourth lens element 440, a fifth lens element 450, a sixth lens element 460, a seventh lens element 470, an IR-cut filter 480 and an image surface 490. The image sensor 495 is disposed on the image surface 490 of the image capturing lens assembly. The image capturing lens assembly includes seven lens elements (410, 420, 430, 440, 450, 460 and 470) without additional one or more lens elements inserted between the first lens element 410 and the seventh lens element 470.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of a plastic material, and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric.

The seventh lens element 470 with negative refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Moreover, the image-side surface 472 of the seventh lens element 470 includes at least one convex shape in an off-axis region thereof.

The IR-cut filter 480 is made of a glass material and located between the seventh lens element 470 and the image surface 490, and will not affect the focal length of the image capturing lens assembly.

The detailed optical data of the 4th embodiment are shown in TABLE 7 and the aspheric surface data are shown in TABLE 8 below.

TABLE 7

4th Embodiment
f = 3.95 mm, Fno = 1.54, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.447 | | | | |
| 2 | Lens 1 | 1.804 | ASP | 0.682 | Plastic | 1.545 | 56.0 | 5.46 |
| 3 | | 3.977 | ASP | 0.112 | | | | |
| 4 | Lens 2 | 2.783 | ASP | 0.230 | Plastic | 1.669 | 19.5 | −14.96 |
| 5 | | 2.105 | ASP | 0.209 | | | | |
| 6 | Stop | Plano | | −0.009 | | | | |
| 7 | Lens 3 | 3.083 | ASP | 0.426 | Plastic | 1.544 | 56.0 | 7.83 |
| 8 | | 10.621 | ASP | −0.113 | | | | |
| 9 | Stop | Plano | | 0.359 | | | | |
| 10 | Lens 4 | −64.351 | ASP | 0.299 | Plastic | 1.669 | 19.5 | −12.69 |
| 11 | | 9.797 | ASP | 0.112 | | | | |
| 12 | Lens 5 | −4.045 | ASP | 0.444 | Plastic | 1.566 | 37.4 | 4.18 |
| 13 | | −1.551 | ASP | 0.050 | | | | |
| 14 | Lens 6 | 5.019 | ASP | 0.355 | Plastic | 1.669 | 19.5 | −27.87 |
| 15 | | 3.842 | ASP | 0.409 | | | | |
| 16 | Lens 7 | 2.962 | ASP | 0.360 | Plastic | 1.566 | 37.4 | −4.39 |
| 17 | | 1.292 | ASP | 0.500 | | | | |
| 18 | IR-cut filter | Plano | | 0.210 | Glass | 1.517 | 64.2 | — |
| 19 | | Plano | | 0.335 | | | | |
| 20 | Image | Plano | | — | | | | |

Reference wavelength is 587.6 nm (d-line).
The effective radius of the surface 6 is 1.055 mm.
The effective radius of the surface 9 is 1.120 mm.

TABLE 8

Aspheric Coefficients

| Surface # | 2 | 3 | 4 | 5 | 7 | 8 | 10 |
|---|---|---|---|---|---|---|---|
| k = | −3.6818E−01 | −3.8570E+00 | −3.7508E+01 | −1.9429E+01 | −2.9332E+01 | −8.1557E+00 | 3.8601E+01 |
| A4 = | −1.9662E−03 | −1.3385E−01 | −9.1973E−02 | −3.9305E−03 | 3.5559E−02 | −6.3602E−02 | −2.2413E−01 |
| A6 = | 2.0708E−02 | 1.4436E−01 | −2.7913E−02 | −7.6238E−02 | −1.0295E−01 | −4.0777E−02 | 4.3960E−02 |
| A8 = | −3.5051E−02 | −1.2712E−01 | 2.6757E−01 | 1.6477E−01 | −1.9121E−02 | −2.4391E−02 | −9.0078E−02 |
| A10 = | 2.8670E−02 | 5.7411E−02 | −3.5815E−01 | −6.7234E−02 | 1.3003E−01 | 9.1403E−03 | −4.0909E−02 |
| A12 = | −1.2548E−02 | −1.1526E−02 | 2.2179E−01 | −6.3460E−02 | −1.8002E−01 | 3.1218E−03 | 4.1421E−01 |
| A14 = | 8.7461E−04 | −3.8881E−05 | −5.1797E−02 | 5.5806E−02 | 8.5098E−02 | | −4.3064E−01 |
| A16 = | | | | | | | 1.3217E−01 |

| Surface # | 11 | 12 | 13 | 14 | 15 | 16 | 17 |
|---|---|---|---|---|---|---|---|
| k = | −1.7194E+01 | 8.3674E+00 | −1.1430E+00 | 5.4988E+00 | −1.6812E+00 | −2.5544E+01 | −6.4772E+00 |
| A4 = | −3.6789E−01 | −2.4503E−01 | 2.1539E−01 | 3.4843E−01 | 1.6540E−01 | −3.3492E−01 | −2.3152E−01 |
| A6 = | 9.8444E−01 | 1.4528E+00 | −5.5150E−01 | −1.1582E+00 | −4.8687E−01 | 2.3132E−01 | 1.6817E−01 |
| A8 = | −2.3448E+00 | −3.2608E+00 | 9.6831E−01 | 1.8174E+00 | 5.5046E−01 | −2.1536E−01 | −1.1175E−01 |
| A10 = | 2.8866E+00 | 3.7590E+00 | −1.0182E+00 | −1.9256E+00 | −4.1065E−01 | 1.7357E−01 | 5.7153E−02 |
| A12 = | −1.8532E+00 | −2.3786E+00 | 6.0104E−01 | 1.3478E+00 | 2.0844E−01 | −8.3338E−02 | −1.9928E−02 |
| A14 = | 5.8466E−01 | 7.8649E−01 | −1.8120E−01 | −6.0271E−01 | −7.0879E−02 | 2.3544E−02 | 4.5208E−03 |
| A16 = | −7.0402E−02 | −1.0610E−01 | 2.1713E−02 | 1.5910E−01 | 1.5378E−02 | −3.8972E−03 | −6.3681E−04 |
| A18 = | | | | −2.1217E−02 | −1.9087E−03 | 3.5143E−04 | 5.0388E−05 |
| A20 = | | | | 9.6741E−04 | 1.0237E−04 | −1.3363E−05 | −1.7038E−06 |

In the 4th embodiment, the equation of the aspheric surface profiles of the aforementioned lens elements is the same as the equation of the 1st embodiment. A4-A20 represent the aspheric coefficients ranging from the 4th order to the 20th order. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 3.95 | T67/T34 | 1.66 |
| Fno | 1.54 | T67/T45 | 3.65 |
| HFOV (deg.) | 39.0 | T67/T56 | 8.18 |
| CRA1.0Y (deg.) | 35.5 | TL/EPD | 1.94 |
| V40 | 5 | TL/ImgH | 1.53 |
| V30 | 3 | (TL$^2$)/(EPD × ImgH) | 2.97 |
| V20 | 3 | EPD/R14 | 1.99 |
| T23/T34 | 0.81 | 2 × Y72/EPD | 1.87 |
| T67/T12 | 3.65 | f/R13 + f/R14 | 4.39 |
| T67/T23 | 2.05 | | |

5th Embodiment

Figure 9:
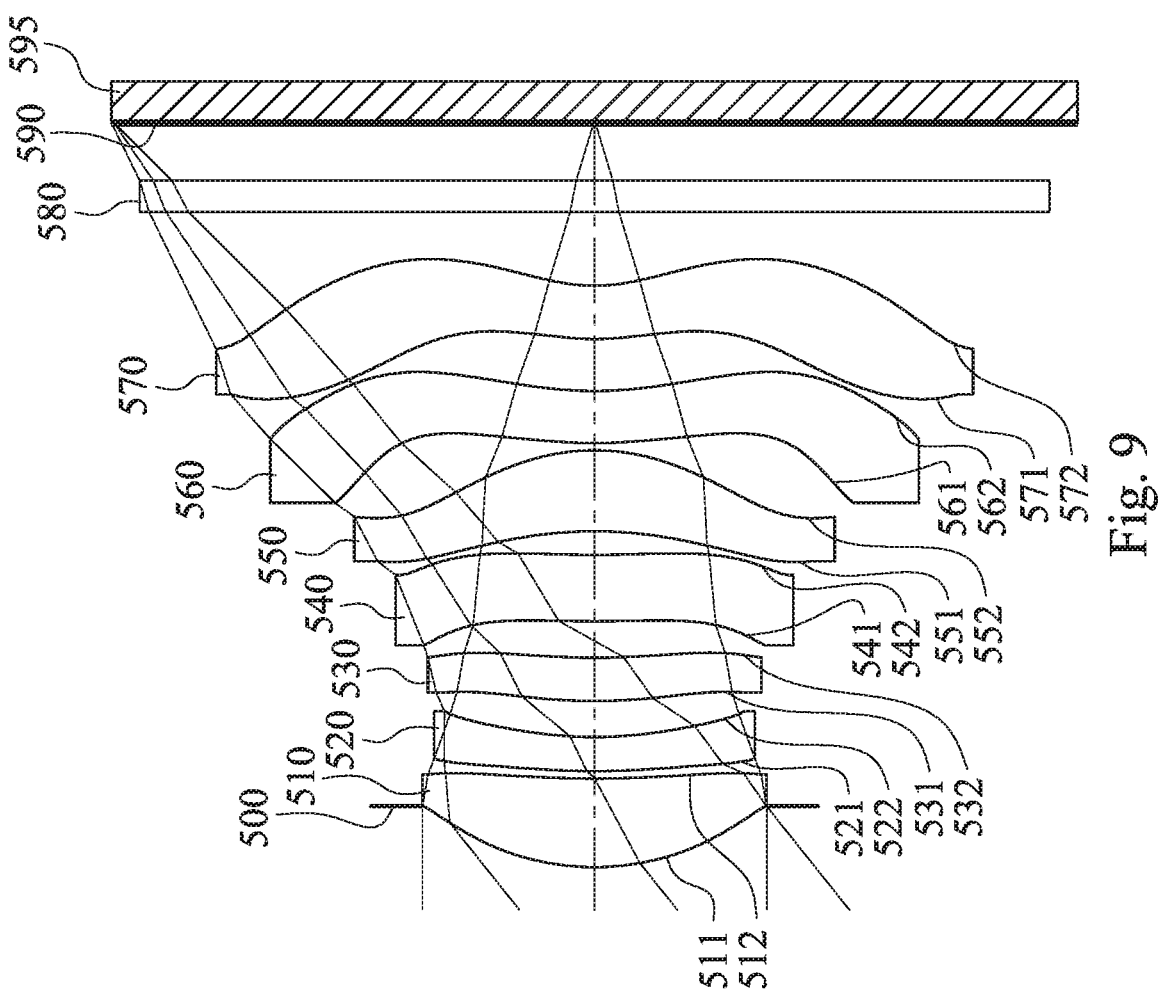
FIG. 9 is a schematic view of an imaging apparatus according to the 5th embodiment of the present disclosure.
Figure 10:
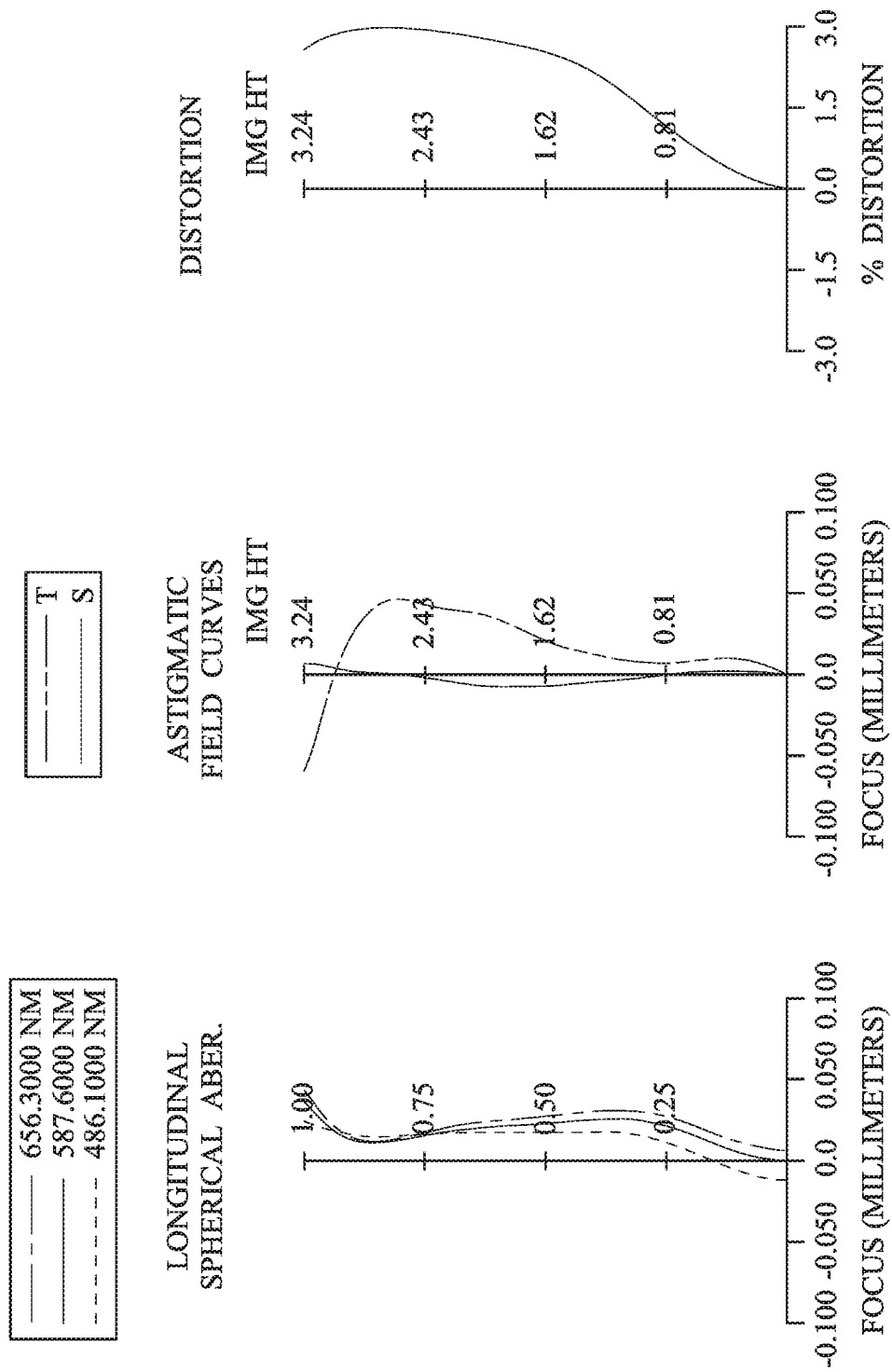
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an image capturing lens assembly (its reference numeral is omitted) and an image sensor 595. The image capturing lens assembly includes, in order from an object side to an image side, an aperture stop 500, a first lens element 510, a second lens element 520, a third lens element 530, a fourth lens element 540, a fifth lens element 550, a sixth lens element 560, a seventh lens element 570, an IR-cut filter 580 and an image surface 590. The image sensor 595 is disposed on the image surface 590 of the image capturing lens assembly. The image capturing lens assembly includes seven lens elements (510, 520, 530, 540, 550, 560 and 570) without additional one or more lens elements inserted between the first lens element 510 and the seventh lens element 570.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric.

The seventh lens element 570 with negative refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Moreover, the image-side surface 572 of the seventh lens element 570 includes at least one convex shape in an off-axis region thereof.

The IR-cut filter 580 is made of a glass material and located between the seventh lens element 570 and the image surface 590, and will not affect the focal length of the image capturing lens assembly.

The detailed optical data of the 5th embodiment are shown in TABLE 9 and the aspheric surface data are shown in TABLE 10 below.

TABLE 9

5th Embodiment
f = 3.94 mm, Fno = 1.70, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.411 | | | | |
| 2 | Lens 1 | 1.737 | ASP | 0.598 | Plastic | 1.545 | 56.0 | 4.05 |
| 3 | | 7.178 | ASP | 0.050 | | | | |
| 4 | Lens 2 | 4.907 | ASP | 0.230 | Plastic | 1.660 | 20.4 | −9.46 |
| 5 | | 2.697 | ASP | 0.242 | | | | |
| 6 | Lens 3 | 3.474 | ASP | 0.293 | Plastic | 1.544 | 56.0 | 20.40 |
| 7 | | 4.906 | ASP | 0.246 | | | | |
| 8 | Lens 4 | 9.195 | ASP | 0.448 | Plastic | 1.660 | 20.4 | −73.62 |
| 9 | | 7.582 | ASP | 0.159 | | | | |
| 10 | Lens 5 | −2.959 | ASP | 0.546 | Plastic | 1.547 | 52.9 | 4.70 |
| 11 | | −1.466 | ASP | 0.050 | | | | |
| 12 | Lens 6 | 3.629 | ASP | 0.350 | Plastic | 1.642 | 21.3 | −13.75 |
| 13 | | 2.475 | ASP | 0.350 | | | | |
| 14 | Lens 7 | 1.810 | ASP | 0.360 | Plastic | 1.544 | 56.0 | −6.67 |
| 15 | | 1.123 | ASP | 0.500 | | | | |
| 16 | IR-cut filter | Plano | | 0.210 | Glass | 1.517 | 64.2 | — |
| 17 | | Plano | | 0.388 | | | | |
| 18 | Image | Plano | | — | | | | |

Reference wavelength is 587.6 nm (d-line).

The effective radius of the surface 8 is 1.150 mm.

TABLE 10

Aspheric Coefficients

| Surface # | 2 | 3 | 4 | 5 | 6 | 7 | 8 |
|---|---|---|---|---|---|---|---|
| k = | 1.0042E−01 | −2.6892E+01 | −9.0000E+01 | −1.6466E+01 | −2.3238E+01 | −9.0000E+01 | 3.4909E+01 |
| A4 = | −5.4966E−03 | −2.7792E−02 | 1.0060E−02 | 4.4515E−02 | 2.1767E−03 | 4.5801E−03 | −1.5161E−01 |
| A6 = | 2.2588E−02 | 5.8394E−02 | −3.0093E−02 | −6.9434E−02 | 9.2372E−03 | −1.3826E−02 | 3.3927E−02 |
| A8 = | −4.8802E−02 | −1.1380E−01 | −1.1833E−03 | 5.5014E−02 | −1.6688E−01 | −9.5541E−02 | −4.3321E−02 |
| A10 = | 5.0190E−02 | 7.7993E−02 | 6.8447E−03 | −2.7778E−02 | 1.0660E−01 | 5.9207E−02 | 4.6448E−03 |
| A12 = | −2.3903E−02 | −2.1053E−02 | 2.4728E−02 | 3.1595E−02 | | | 4.2287E−03 |
| A14 = | | | −9.9454E−03 | | | | 3.9429E−03 |

| Surface # | 9 | 10 | 11 | 12 | 13 | 14 | 15 |
|---|---|---|---|---|---|---|---|
| k = | −7.5249E+01 | −3.7160E−01 | −1.1327E+00 | 1.7314E+00 | −4.2107E+00 | −1.4495E+01 | −5.5865E+00 |
| A4 = | −1.0668E−01 | −3.9500E−02 | −4.6900E−02 | −1.0069E−01 | −8.9882E−02 | −2.2346E−01 | −1.6340E−01 |
| A6 = | 5.3195E−02 | 1.1021E−01 | 1.3889E−01 | 6.4311E−02 | 4.9731E−02 | 7.8700E−02 | 8.4378E−02 |
| A8 = | −5.9052E−02 | −7.6836E−02 | −1.4182E−01 | −7.5050E−02 | −3.1373E−02 | −1.2597E−02 | −3.5495E−02 |
| A10 = | 2.9796E−02 | 2.3148E−02 | 9.2356E−02 | 4.2233E−02 | 1.0617E−02 | 1.4587E−03 | 1.0245E−02 |
| A12 = | −4.6891E−03 | 9.9355E−04 | −2.7016E−02 | −1.5854E−02 | −1.8922E−03 | −2.2403E−04 | −1.8070E−03 |
| A14 = | −3.0021E−03 | −1.2062E−03 | 2.1408E−03 | 3.4273E−03 | 1.8001E−04 | 2.8918E−05 | 1.7223E−04 |
| A16 = | 1.9547E−03 | | 1.9840E−04 | −2.8306E−04 | −8.0060E−06 | −1.5088E−06 | −6.6932E−06 |

In the 5th embodiment, the equation of the aspheric surface profiles of the aforementioned lens elements is the same as the equation of the 1st embodiment. A4-A20 represent the aspheric coefficients ranging from the 4th order to the 20th order. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 3.94 | T67/T34 | 1.42 |
| Fno | 1.70 | T67/T45 | 2.20 |
| HFOV (deg.) | 38.6 | T67/T56 | 7.00 |
| CRA1.0Y (deg.) | 34.2 | TL/EPD | 2.17 |
| V40 | 3 | TL/ImgH | 1.55 |
| V30 | 3 | $(TL^2)/(EPD \times ImgH)$ | 3.36 |
| V20 | 0 | EPD/R14 | 2.06 |
| T23/T34 | 0.98 | $2 \times Y72/EPD$ | 2.20 |
| T67/T12 | 7.00 | f/R13 + f/R14 | 5.68 |
| T67/T23 | 1.45 | | |

6th Embodiment

Figure 11:
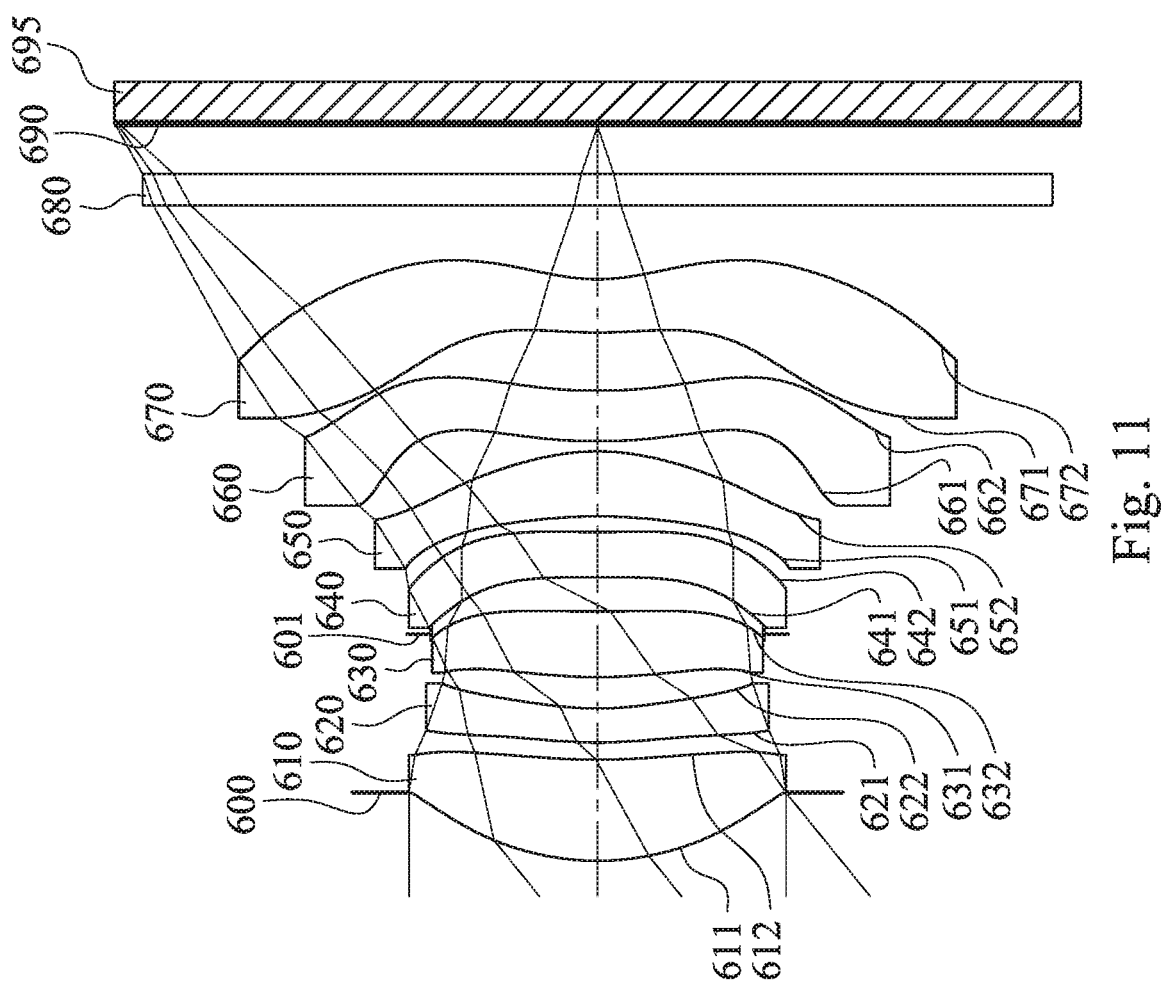
FIG. 11 is a schematic view of an imaging apparatus according to the 6th embodiment of the present disclosure.
Figure 12:
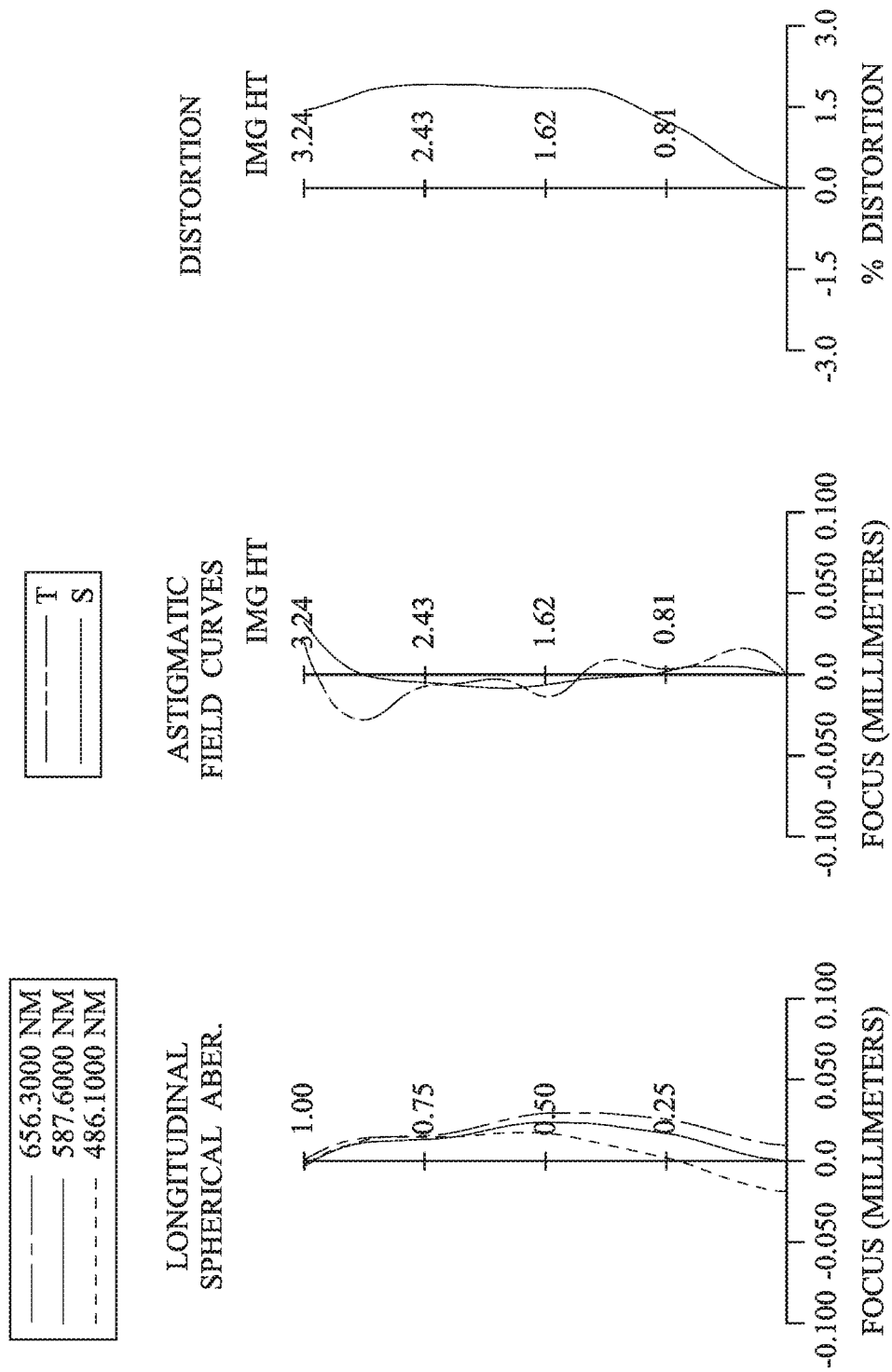
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an image capturing lens assembly (its reference numeral is omitted) and an image sensor 695. The image capturing lens assembly includes, in order from an object side to an image side, an aperture stop 600, a first lens element 610, a second lens element 620, a third lens element 630, a stop 601, a fourth lens element 640, a fifth lens element 650, a sixth lens element 660, a seventh lens element 670, an IR-cut filter 680 and an image surface 690. The image sensor 695 is disposed on the image surface 690 of the image capturing lens assembly. The image capturing lens assembly includes seven lens elements (610, 620, 630, 640, 650, 660 and 670) without additional one or more lens elements inserted between the first lens element 610 and the seventh lens element 670.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of a plastic material, and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric.

The seventh lens element 670 with negative refractive power has an object-side surface 671 being convex in a paraxial region thereof and an image-side surface 672 being concave in a paraxial region thereof. The seventh lens element 670 is made of a plastic material, and has the object-side surface 671 and the image-side surface 672 being both aspheric. Moreover, the image-side surface 672 of the seventh lens element 670 includes at least one convex shape in an off-axis region thereof.

The IR-cut filter 680 is made of a glass material and located between the seventh lens element 670 and the image surface 690, and will not affect the focal length of the image capturing lens assembly.

The detailed optical data of the 6th embodiment are shown in TABLE 11 and the aspheric surface data are shown in TABLE 12 below.

TABLE 11

6th Embodiment
f = 3.92 mm, Fno = 1.54, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.460 | | | | |
| 2 | Lens 1 | 1.811 | ASP | 0.682 | Plastic | 1.545 | 56.0 | 5.28 |
| 3 | | 4.242 | ASP | 0.115 | | | | |
| 4 | Lens 2 | 2.917 | ASP | 0.230 | Plastic | 1.669 | 19.5 | −15.48 |
| 5 | | 2.204 | ASP | 0.212 | | | | |
| 6 | Lens 3 | 3.578 | ASP | 0.442 | Plastic | 1.544 | 56.0 | 8.51 |
| 7 | | 15.059 | ASP | −0.153 | | | | |
| 8 | Stop | Plano | | 0.384 | | | | |

TABLE 11-continued

6th Embodiment
f = 3.92 mm, Fno = 1.54, HFOV = 39.0 deg.

| Surface # | | Curvature Radius | | Thickness | Material | Index | Abbe # | Focal Length |
|---|---|---|---|---|---|---|---|---|
| 9 | Lens 4 | −52.871 | ASP | 0.304 | Plastic | 1.669 | 19.5 | −12.50 |
| 10 | | 9.953 | ASP | 0.106 | | | | |
| 11 | Lens 5 | −3.995 | ASP | 0.439 | Plastic | 1.566 | 37.4 | 4.16 |
| 12 | | −1.540 | ASP | 0.069 | | | | |
| 13 | Lens 6 | 5.264 | ASP | 0.341 | Plastic | 1.669 | 19.5 | −50.93 |
| 14 | | 4.441 | ASP | 0.390 | | | | |
| 15 | Lens 7 | 3.079 | ASP | 0.360 | Plastic | 1.566 | 37.4 | −4.11 |
| 16 | | 1.269 | ASP | 0.500 | | | | |
| 17 | IR-cut filter | Plano | | 0.210 | Glass | 1.517 | 64.2 | — |
| 18 | | Plano | | 0.341 | | | | |
| 19 | Image | Plano | | — | | | | |

Reference wavelength is 587.6 nm (d-line).
The effective radius of the surface 8 is 1.120 mm.

TABLE 12

Aspheric Coefficients

| Surface # | 2 | 3 | 4 | 5 | 6 | 7 | 9 |
|---|---|---|---|---|---|---|---|
| k = | −9.4536E−03 | −2.5542E−01 | −4.6454E+01 | −2.0116E+01 | −3.5054E+01 | −7.6395E+01 | 6.9810E+01 |
| A4 = | −2.4715E−03 | −1.0957E−01 | −3.1358E−02 | 1.9062E−02 | 3.2536E−02 | −7.9330E−02 | −2.5558E−01 |
| A6 = | −5.3775E−04 | 8.7127E−02 | −1.8883E−01 | −1.3659E−01 | −1.0786E−01 | −1.1348E−03 | 9.0870E−02 |
| A8 = | 6.3262E−03 | −6.4780E−02 | 4.6495E−01 | 2.1178E−01 | −1.0401E−02 | −1.0639E−01 | −1.9343E−01 |
| A10 = | −1.7431E−02 | 2.6954E−02 | −4.8556E−01 | −6.7025E−02 | 1.0937E−01 | 7.7006E−02 | 1.4410E−01 |
| A12 = | 1.3990E−02 | −6.4491E−03 | 2.6122E−01 | −7.8871E−02 | −1.5243E−01 | −1.6906E−02 | 2.0349E−01 |
| A14 = | −5.0098E−03 | 4.0147E−05 | −5.6546E−02 | 6.0261E−02 | 7.1805E−02 | | −3.0122E−01 |
| A16 = | | | | | | | 1.0090E−01 |

| Surface # | 10 | 11 | 12 | 13 | 14 | 15 | 16 |
|---|---|---|---|---|---|---|---|
| k = | −8.9551E+01 | 8.2993E+00 | −1.2392E+00 | 5.3552E+00 | −2.2336E+00 | −2.4424E+01 | −6.1065E+00 |
| A4 = | −3.2849E−01 | −1.8244E−01 | 1.9668E−01 | 3.2127E−01 | 1.9709E−01 | −3.3021E−01 | −2.3159E−01 |
| A6 = | 7.7567E−01 | 1.2304E+00 | −5.1343E−01 | −1.0309E+00 | −5.6038E−01 | 2.1461E−01 | 1.7293E−01 |
| A8 = | −1.9702E+00 | −3.0702E+00 | 9.1278E−01 | 1.4970E+00 | 6.6501E−01 | −1.8996E−01 | −1.1485E−01 |
| A10 = | 2.5962E+00 | 4.0137E+00 | −9.5064E−01 | −1.4103E+00 | −5.1994E−01 | 1.5512E−01 | 5.8194E−02 |
| A12 = | −1.7871E+00 | −3.0039E+00 | 5.5090E−01 | 8.2966E−01 | 2.7311E−01 | −7.5967E−02 | −2.0132E−02 |
| A14 = | 6.1193E−01 | 1.2767E+00 | −1.6282E−01 | −2.8173E−01 | −9.4696E−02 | 2.1820E−02 | 4.5300E−03 |
| A16 = | −8.2195E−02 | −2.8040E−01 | 1.9125E−02 | 4.1063E−02 | 2.0686E−02 | −3.6618E−03 | −6.3192E−04 |
| A18 = | | 2.3858E−02 | | 2.2667E−03 | −2.5637E−03 | 3.3407E−04 | 4.9458E−05 |
| A20 = | | | | −9.7151E−04 | 1.3673E−04 | −1.2833E−05 | −1.6540E−06 |

In the 6th embodiment, the equation of the aspheric surface profiles of the aforementioned lens elements is the same as the equation of the 1st embodiment. A4-A20 represent the aspheric coefficients ranging from the 4th order to the 20th order. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 3.92 | T67/T34 | 1.69 |
| Fno | 1.54 | T67/T45 | 3.68 |
| HFOV (deg.) | 39.0 | T67/T56 | 5.65 |
| CRA1.0Y (deg.) | 35.5 | TL/EPD | 1.95 |
| V40 | 5 | TL/ImgH | 1.54 |
| V30 | 3 | (TL$^2$)/(EPD × ImgH) | 3.00 |
| V20 | 3 | EPD/R14 | 2.01 |
| T23/T34 | 0.92 | 2 × Y72/EPD | 1.90 |
| T67/T12 | 3.39 | f/R13 + f/R14 | 4.36 |
| T67/T23 | 1.84 | | |

7th Embodiment

Figure 13:
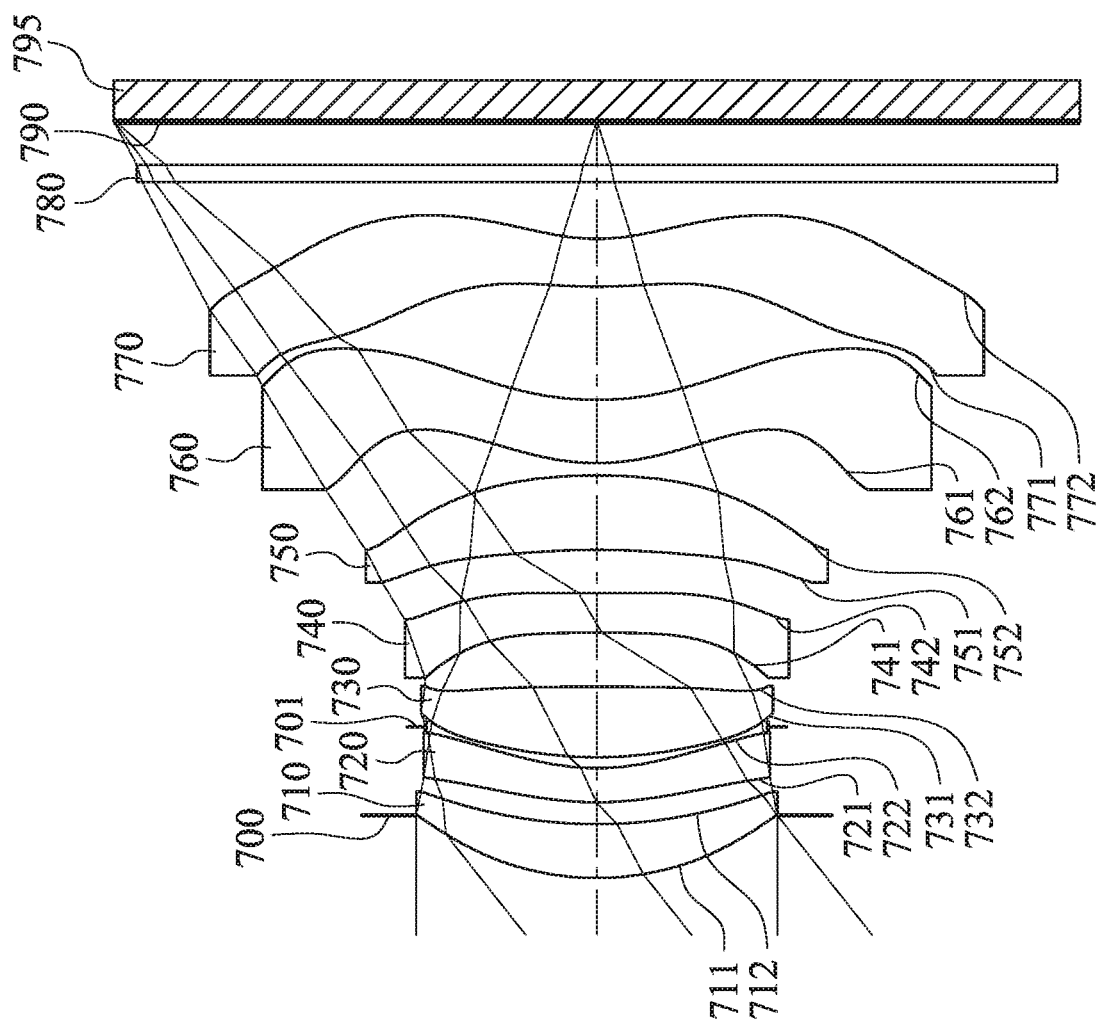
FIG. 13 is a schematic view of an imaging apparatus according to the 7th embodiment of the present disclosure.
Figure 14:
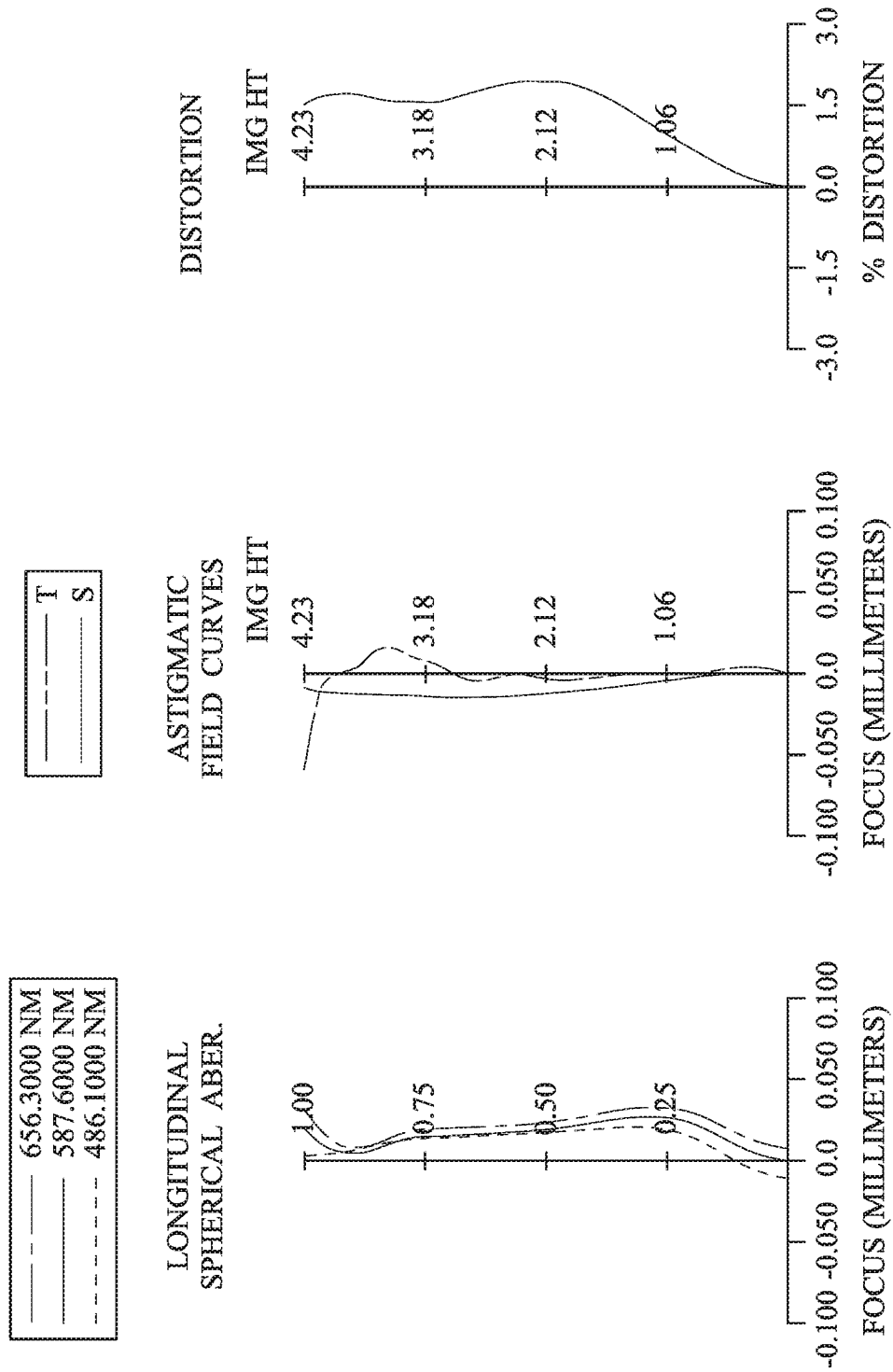
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an image capturing lens assembly (its reference numeral is omitted) and an image sensor 795. The image capturing lens assembly includes, in order from an object side to an image side, an aperture stop 700, a first lens element 710, a second lens element 720, a stop 701, a third lens element 730, a fourth lens element 740, a fifth lens element 750, a sixth lens element 760, a seventh lens element 770, an IR-cut filter 780 and an image surface 790. The image sensor 795 is disposed on the image surface 790 of the image capturing lens assembly. The image capturing lens assembly includes seven lens elements (710, 720, 730, 740, 750, 760 and 770) without additional one or more lens elements inserted between the first lens element 710 and the seventh lens element 770.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric.

The seventh lens element 770 with negative refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric. Moreover, the image-side surface 772 of the seventh lens element 770 includes at least one convex shape in an off-axis region thereof.

The IR-cut filter 780 is made of a glass material and located between the seventh lens element 770 and the image surface 790, and will not affect the focal length of the image capturing lens assembly.

The detailed optical data of the 7th embodiment are shown in TABLE 13 and the aspheric surface data are shown in TABLE 14 below.

TABLE 13

7th Embodiment
f = 5.26 mm, Fno = 1.66, HFOV = 38.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.549 | | | | |
| 2 | Lens 1 | 2.490 ASP | 0.473 | Plastic | 1.545 | 56.0 | 10.03 |
| 3 | | 4.268 ASP | 0.192 | | | | |
| 4 | Lens 2 | 3.047 ASP | 0.300 | Plastic | 1.669 | 19.5 | −13.47 |
| 5 | | 2.187 ASP | 0.363 | | | | |
| 6 | Stop | Plano | −0.268 | | | | |
| 7 | Lens 3 | 3.652 ASP | 0.619 | Plastic | 1.544 | 56.0 | 6.49 |
| 8 | | −100.000 ASP | 0.474 | | | | |
| 9 | Lens 4 | −30.361 ASP | 0.350 | Plastic | 1.669 | 19.5 | −27.65 |
| 10 | | 47.545 ASP | 0.378 | | | | |
| 11 | Lens 5 | −6.062 ASP | 0.652 | Plastic | 1.559 | 40.4 | 176.12 |
| 12 | | −5.931 ASP | 0.109 | | | | |
| 13 | Lens 6 | 1.982 ASP | 0.556 | Plastic | 1.544 | 56.0 | 8.97 |
| 14 | | 3.008 ASP | 0.992 | | | | |
| 15 | Lens 7 | 4.100 ASP | 0.420 | Plastic | 1.544 | 56.0 | −5.82 |
| 16 | | 1.722 ASP | 0.500 | | | | |
| 17 | IR-cut filter | Plano | 0.150 | Glass | 1.517 | 64.2 | — |
| 18 | | Plano | 0.380 | | | | |
| 19 | Image | Plano | — | | | | |

Reference wavelength is 587.6 nm (d-line).
The effective radius of the surface 6 is 1.500 mm.

TABLE 14

Aspheric Coefficients

| Surface # | 2 | 3 | 4 | 5 | 7 | 8 | 9 |
|---|---|---|---|---|---|---|---|
| k = | −3.6665E−02 | −2.0768E+01 | −2.3089E+01 | −2.4902E+00 | 2.7747E+00 | −8.6102E+00 | 9.0000E+01 |
| A4 = | 3.5702E−03 | 3.9323E−02 | 6.3123E−02 | −1.0852E−02 | −9.8187E−03 | −2.0115E−02 | −7.0242E−02 |
| A6 = | −3.5164E−03 | −2.9198E−02 | −1.0602E−01 | −3.6550E−02 | −7.2500E−03 | 1.8562E−03 | −6.5252E−03 |
| A8 = | 4.4562E−03 | 2.0848E−02 | 9.0208E−02 | 2.4768E−02 | −2.1798E−02 | −2.4534E−03 | −7.0043E−03 |
| A10 = | −3.7751E−03 | −9.5301E−03 | −4.4461E−02 | −4.4316E−03 | 2.9012E−02 | 5.9243E−03 | 1.5208E−02 |
| A12 = | 1.6498E−03 | 2.7234E−03 | 1.1761E−02 | −5.2657E−04 | −1.1337E−02 | −2.9429E−03 | −7.8688E−03 |
| A14 = | −3.0458E−04 | −4.0061E−04 | −1.3013E−03 | 9.0587E−05 | 1.5512E−03 | 6.7968E−04 | 1.5070E−03 |
| | | | | | | | −5.5120E−05 |

| Surface # | 10 | 11 | 12 | 13 | 14 | 15 | 16 |
|---|---|---|---|---|---|---|---|
| k = | −2.0000E+01 | −8.6431E+01 | −9.0000E+01 | −7.6005E−01 | −4.4251E−01 | −3.1377E−01 | −4.7686E+00 |
| A4 = | −3.7254E−02 | 3.3623E−03 | −1.1478E−01 | −6.7567E−02 | 3.9075E−02 | −1.6682E−01 | −1.0027E−01 |
| A6 = | −1.6632E−02 | 2.5823E−04 | 7.6092E−02 | 1.7614E−02 | −4.5414E−02 | 6.9617E−02 | 4.7681E−02 |
| A8 = | 6.9005E−03 | −6.9411E−03 | −4.0333E−02 | −1.2968E−02 | 1.6489E−02 | −2.2890E−02 | −1.7393E−02 |
| A10 = | 1.9780E−03 | 8.3827E−04 | 1.5289E−02 | 4.9635E−03 | −3.5247E−03 | 5.6183E−03 | 4.4096E−03 |
| A12 = | −1.5998E−03 | 2.4168E−03 | −4.6300E−03 | −1.0500E−03 | 4.4990E−04 | −9.1855E−04 | −7.6029E−04 |
| A14 = | 2.8858E−04 | −1.5765E−03 | 1.3196E−03 | 1.3305E−04 | −2.9538E−05 | 9.8370E−05 | 8.6361E−05 |
| A16 = | 2.5776E−06 | 3.9407E−04 | −3.4733E−04 | −2.0210E−05 | 3.7661E−07 | −7.0258E−06 | −6.1078E−06 |
| A18 = | | −3.3124E−05 | 6.1387E−05 | 3.5728E−06 | 4.7661E−08 | 3.2127E−07 | 2.4209E−07 |
| A20 = | | −5.5440E−07 | −4.6176E−06 | −2.5540E−07 | −1.2418E−09 | −7.2294E−09 | −4.0991E−09 |

In the 7th embodiment, the equation of the aspheric surface profiles of the aforementioned lens elements is the same as the equation of the 1st embodiment. A4-A20 represent the aspheric coefficients ranging from the 4th order to the 20th order. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 5.26 | T67/T34 | 2.09 |
| Fno | 1.66 | T67/T45 | 2.62 |
| HFOV (deg.) | 38.4 | T67/T56 | 9.10 |
| CRA1.0Y (deg.) | 37.0 | TL/EPD | 2.10 |
| V40 | 2 | TL/ImgH | 1.57 |
| V30 | 2 | (TL$^2$)/(EPD × ImgH) | 3.29 |
| V20 | 2 | EPD/R14 | 1.84 |
| T23/T34 | 0.20 | 2 × Y72/EPD | 2.14 |
| T67/T12 | 5.17 | f/R13 + f/R14 | 4.34 |
| T67/T23 | 10.44 | | |

8th Embodiment

Figure 15:
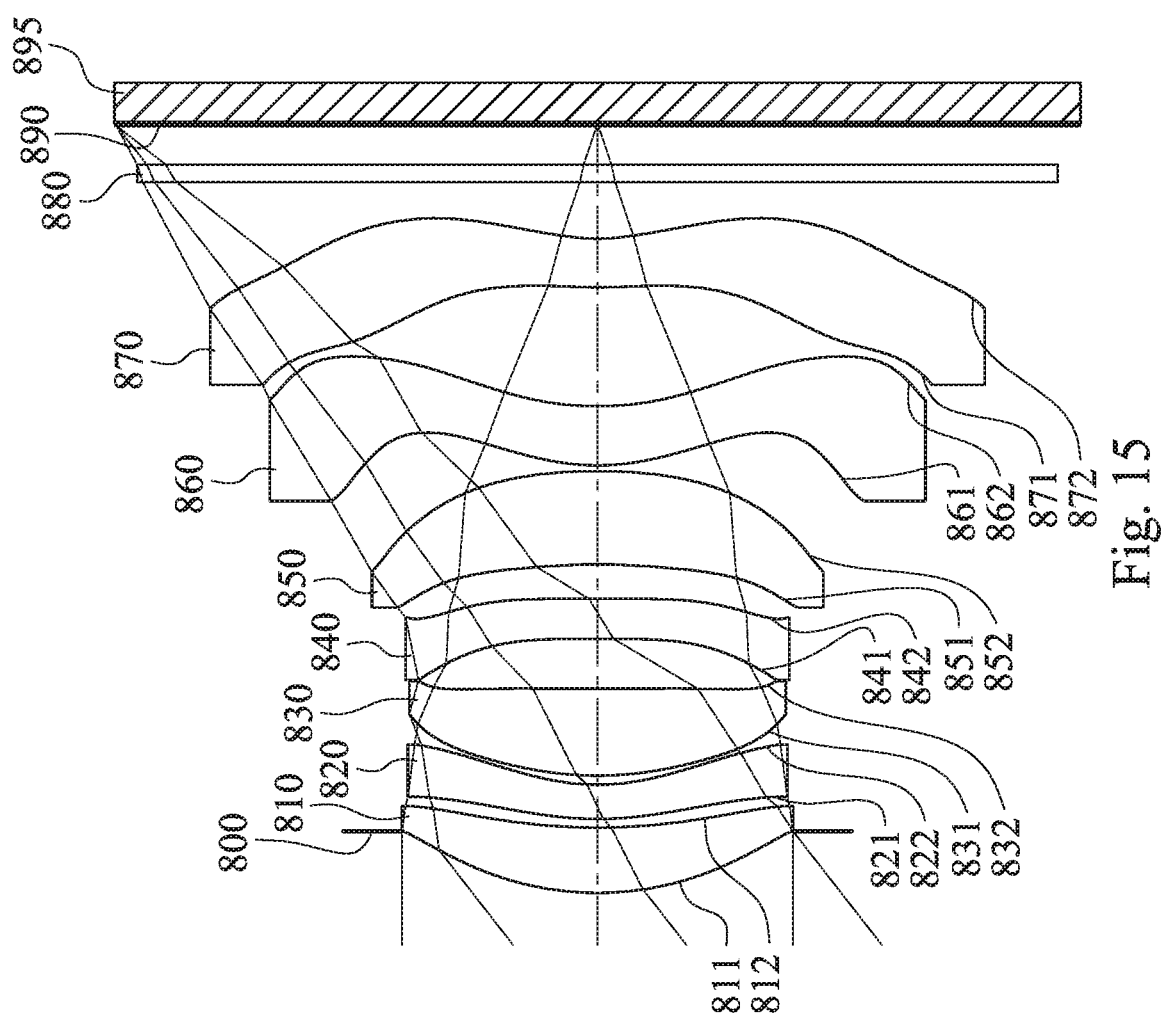
FIG. 15 is a schematic view of an imaging apparatus according to the 8th embodiment of the present disclosure.
Figure 16:
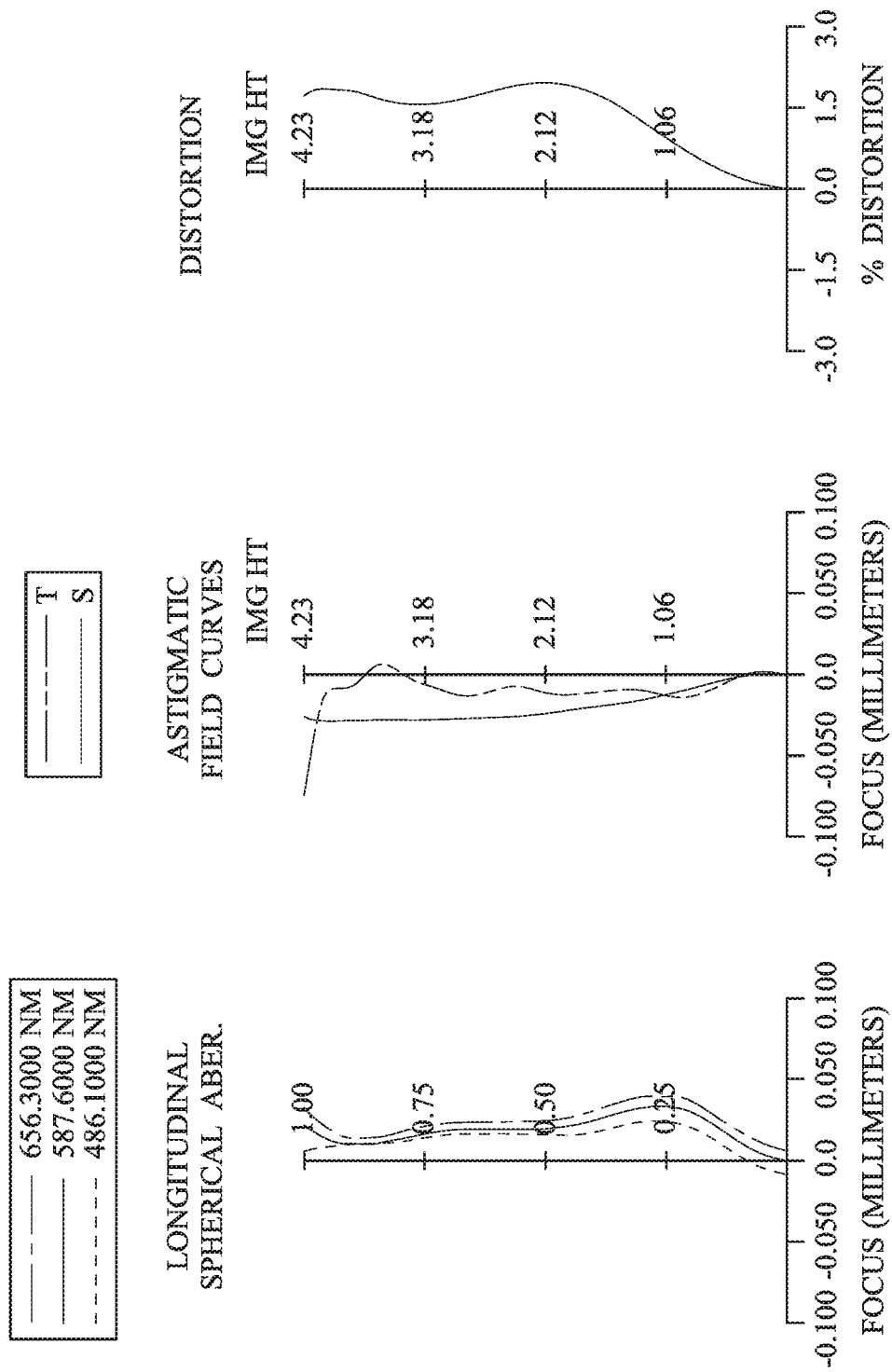
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an image capturing lens assembly (its reference numeral is omitted) and an image sensor 895. The image capturing lens assembly includes, in order from an object side to an image side, an aperture stop 800, a first lens element 810, a second lens element 820, a third lens element 830, a fourth lens element 840, a fifth lens element 850, a sixth lens element 860, a seventh lens element 870, an IR-cut filter 880 and an image surface 890. The image sensor 895 is disposed on the image surface 890 of the image capturing lens assembly. The image capturing lens assembly includes seven lens elements (810, 820, 830, 840, 850, 860 and 870) without additional one or more lens elements inserted between the first lens element 810 and the seventh lens element 870.

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of a plastic material, and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric.

The seventh lens element 870 with negative refractive power has an object-side surface 871 being convex in a paraxial region thereof and an image-side surface 872 being concave in a paraxial region thereof. The seventh lens element 870 is made of a plastic material, and has the object-side surface 871 and the image-side surface 872 being both aspheric. Moreover, the image-side surface 872 of the seventh lens element 870 includes at least one convex shape in an off-axis region thereof.

The IR-cut filter 880 is made of a glass material and located between the seventh lens element 870 and the image surface 890, and will not affect the focal length of the image capturing lens assembly.

The detailed optical data of the 8th embodiment are shown in TABLE 15 and the aspheric surface data are shown in TABLE 16 below.

TABLE 15

8th Embodiment
f = 5.32 mm, Fno = 1.55, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.542 | | | | |
| 2 | Lens 1 | 2.708 | ASP | 0.573 | Plastic | 1.545 | 56.1 | 8.64 |
| 3 | | 5.895 | ASP | 0.077 | | | | |
| 4 | Lens 2 | 3.244 | ASP | 0.300 | Plastic | 1.650 | 21.5 | −9.10 |
| 5 | | 2.019 | ASP | 0.080 | | | | |
| 6 | Lens 3 | 3.062 | ASP | 0.764 | Plastic | 1.544 | 56.0 | 6.02 |
| 7 | | 43.137 | ASP | 0.438 | | | | |
| 8 | Lens 4 | −31.569 | ASP | 0.353 | Plastic | 1.639 | 23.5 | −72.38 |
| 9 | | −100.000 | ASP | 0.301 | | | | |
| 10 | Lens 5 | −5.230 | ASP | 0.819 | Plastic | 1.544 | 56.0 | 177.98 |
| 11 | | −5.236 | ASP | 0.050 | | | | |
| 12 | Lens 6 | 2.028 | ASP | 0.521 | Plastic | 1.534 | 55.9 | 10.35 |
| 13 | | 2.918 | ASP | 1.044 | | | | |
| 14 | Lens 7 | 5.843 | ASP | 0.427 | Plastic | 1.534 | 55.9 | −5.71 |
| 15 | | 1.953 | ASP | 0.500 | | | | |
| 16 | IR-cut filter | Plano | | 0.150 | Glass | 1.517 | 64.2 | — |
| 17 | | Plano | | 0.356 | | | | |
| 18 | Image | Plano | | — | | | | |

Reference wavelength is 587.6 nm (d-line).
The effective radius of the surface 15 is 3.400 mm.

TABLE 16

Aspheric Coefficients

| Surface # | 2 | 3 | 4 | 5 | 6 | 7 | 8 |
|---|---|---|---|---|---|---|---|
| k = | −4.9818E−01 | −2.0768E+01 | −2.5344E+01 | −2.5045E+00 | 1.8024E+00 | −8.6102E+00 | 9.0000E+01 |
| A4 = | 4.7203E−03 | 5.3473E−02 | 8.9287E−02 | −1.1999E−03 | −1.2801E−02 | −1.7803E−02 | −6.0269E−02 |
| A6 = | −5.3729E−04 | −6.8352E−02 | −1.4462E−01 | −4.0489E−02 | 4.2010E−03 | 1.6589E−03 | −1.5721E−02 |
| A8 = | −8.7590E−04 | 4.5120E−02 | 1.0661E−01 | 1.7591E−02 | −3.2793E−02 | 1.8893E−03 | 6.1518E−03 |
| A10 = | 6.7349E−05 | −1.7186E−02 | −4.4467E−02 | 4.9188E−04 | 2.9161E−02 | 3.9254E−04 | 4.4800E−03 |
| A12 = | 1.2547E−04 | 3.5777E−03 | 9.9435E−03 | −1.6417E−03 | −9.4901E−03 | −2.8986E−04 | −2.5870E−03 |
| A14 = | −4.4185E−05 | −3.3340E−04 | −9.3018E−04 | 2.2665E−04 | 1.1106E−03 | 1.4827E−04 | 5.9455E−04 |
| A16 = | | | | | | | −7.3364E−05 |

| Surface # | 9 | 10 | 11 | 12 | 13 | 14 | 15 |
|---|---|---|---|---|---|---|---|
| k = | −2.0000E+01 | −8.6431E+01 | −9.0000E+01 | −8.5023E−01 | −3.9054E−01 | 7.9729E−01 | −5.4844E+00 |
| A4 = | −2.3402E−02 | −1.2625E−02 | −1.2551E−01 | −5.6841E−02 | 3.5271E−02 | −1.4707E−01 | −9.0133E−02 |
| A6 = | −2.6129E−02 | 3.3613E−02 | 1.0560E−01 | 1.3480E−02 | −4.2435E−02 | 5.3927E−02 | 4.0519E−02 |
| A8 = | 8.1134E−03 | −7.5950E−02 | −8.8913E−02 | −1.4428E−02 | 1.3837E−02 | −1.4235E−02 | −1.4448E−02 |
| A10 = | 4.3615E−03 | 7.9621E−02 | 5.7560E−02 | 7.5632E−03 | −2.2591E−03 | 2.1354E−03 | 3.6220E−03 |
| A12 = | −2.5727E−03 | −5.6998E−02 | −2.7448E−02 | −2.6655E−03 | 8.2393E−05 | 7.0196E−05 | −6.2213E−04 |
| A14 = | 5.1744E−04 | 2.8098E−02 | 8.9776E−03 | 7.1040E−04 | 3.8541E−05 | −8.1365E−05 | 7.0950E−05 |
| A16 = | −2.7450E−05 | −8.9132E−03 | −1.4304E−03 | −1.4304E−04 | −7.4045E−06 | 1.2385E−05 | −5.0613E−06 |
| A18 = | | 1.6058E−03 | 2.1902E−04 | 1.7795E−05 | 5.3504E−07 | −8.0796E−07 | 2.0257E−07 |
| A20 = | | −1.2272E−04 | −1.0729E−05 | −9.3503E−07 | −1.3730E−08 | 2.0017E−08 | −3.4591E−09 |

In the 8th embodiment, the equation of the aspheric surface profiles of the aforementioned lens elements is the same as the equation of the 1st embodiment. A4-A20 represent the aspheric coefficients ranging from the 4th order to the 20th order. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 5.32 | T67/T34 | 2.38 |
| Fno | 1.55 | T67/T45 | 3.47 |
| HFOV (deg.) | 38.0 | T67/T56 | 20.88 |
| CRA1.0Y (deg.) | 38.1 | TL/EPD | 1.97 |
| V40 | 2 | TL/ImgH | 1.59 |
| V30 | 2 | $(TL^2)/(EPD \times ImgH)$ | 3.14 |
| V20 | 0 | EPD/R14 | 1.76 |
| T23/T34 | 0.18 | $2 \times Y72$/EPD | 1.98 |
| T67/T12 | 13.56 | f/R13 + f/R14 | 3.63 |
| T67/T23 | 13.05 | | |

9th Embodiment

Figure 17:
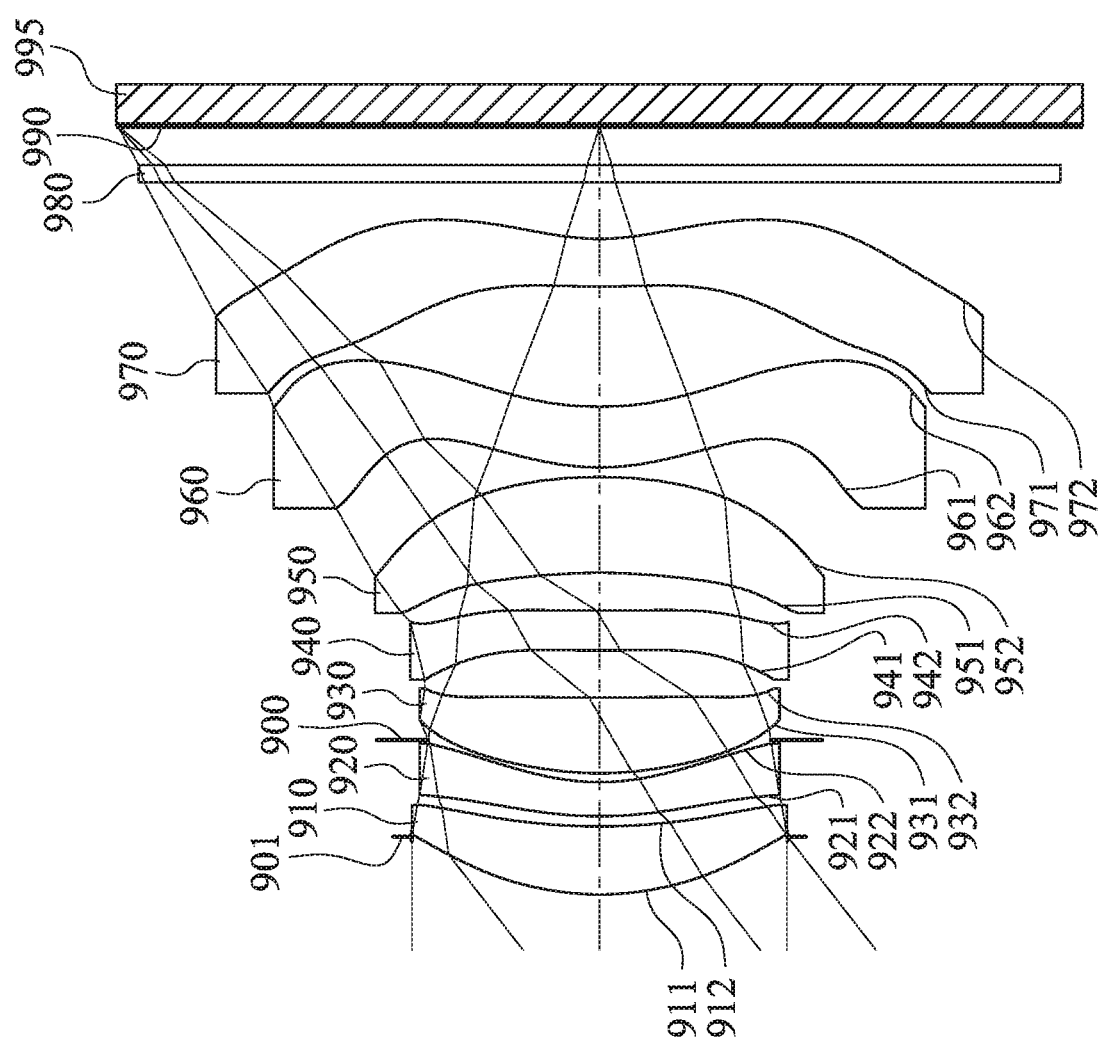
FIG. 17 is a schematic view of an imaging apparatus according to the 9th embodiment of the present disclosure.
Figure 18:
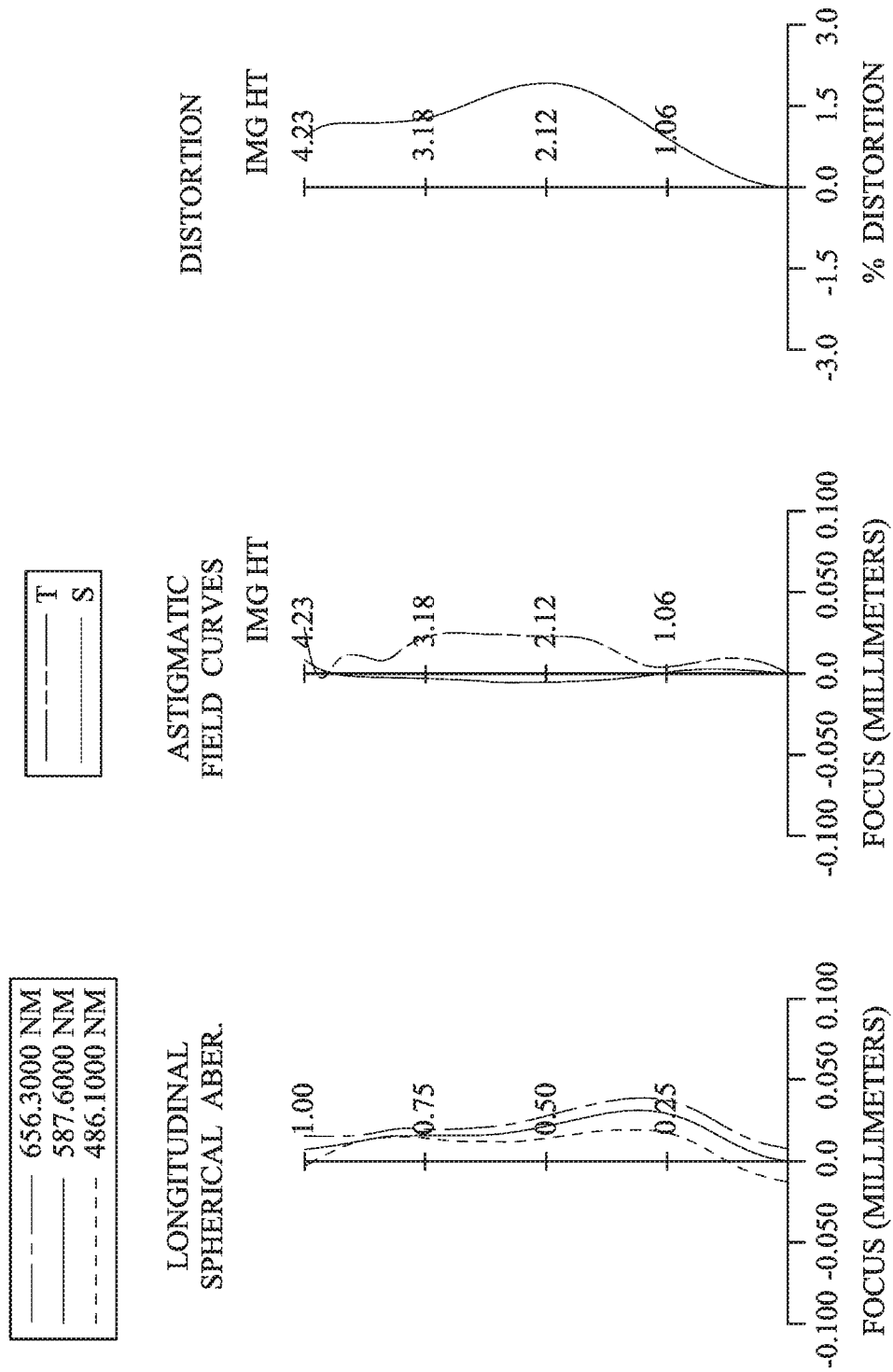
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an image capturing lens assembly (its reference numeral is omitted) and an image sensor 995. The image capturing lens assembly includes, in order from an object side to an image side, a stop 901, a first lens element 910, a second lens element 920, an aperture stop 900, a third lens element 930, a fourth lens element 940, a fifth lens element 950, a sixth lens element 960, a seventh lens element 970, an IR-cut filter 980 and an image surface 990. The image sensor 995 is disposed on the image surface 990 of the image capturing lens assembly. The image capturing lens assembly includes seven lens elements (910, 920, 930, 940, 950, 960 and 970) without additional one or more lens elements inserted between the first lens element 910 and the seventh lens element 970.

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric.

The fourth lens element 940 with positive refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of a plastic material, and has the object-side surface 951 and the image-side surface 952 being both aspheric.

The sixth lens element 960 with positive refractive power has an object-side surface 961 being convex in a paraxial region thereof and an image-side surface 962 being concave in a paraxial region thereof. The sixth lens element 960 is made of a plastic material, and has the object-side surface 961 and the image-side surface 962 being both aspheric.

The seventh lens element 970 with negative refractive power has an object-side surface 971 being convex in a paraxial region thereof and an image-side surface 972 being concave in a paraxial region thereof. The seventh lens element 970 is made of a plastic material, and has the object-side surface 971 and the image-side surface 972 being both aspheric. Moreover, the image-side surface 972 of the seventh lens element 970 includes at least one convex shape in an off-axis region thereof.

The IR-cut filter 980 is made of a glass material and located between the seventh lens element 970 and the image surface 990, and will not affect the focal length of the image capturing lens assembly.

The detailed optical data of the 9th embodiment are shown in TABLE 17 and the aspheric surface data are shown in TABLE 18 below.

TABLE 17

9th Embodiment
f = 5.38 mm, Fno = 1.64, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.508 | | | | |
| 2 | Lens 1 | 2.637 | ASP | 0.596 | Plastic | 1.545 | 56.1 | 8.52 |
| 3 | | 5.617 | ASP | 0.090 | | | | |
| 4 | Lens 2 | 3.468 | ASP | 0.300 | Plastic | 1.650 | 21.5 | −8.77 |
| 5 | | 2.083 | ASP | 0.369 | | | | |
| 6 | Ape. Stop | Plano | | −0.292 | | | | |
| 7 | Lens 3 | 3.062 | ASP | 0.666 | Plastic | 1.544 | 56.0 | 6.37 |
| 8 | | 24.259 | ASP | 0.414 | | | | |

TABLE 17-continued

9th Embodiment
f = 5.38 mm, Fno = 1.64, HFOV = 37.9 deg.

| Surface # | | Curvature Radius | | Thickness | Material | Index | Abbe # | Focal Length |
|---|---|---|---|---|---|---|---|---|
| 9 | Lens 4 | 19.837 | ASP | 0.350 | Plastic | 1.639 | 23.5 | 151.19 |
| 10 | | 24.794 | ASP | 0.332 | | | | |
| 11 | Lens 5 | −4.841 | ASP | 0.841 | Plastic | 1.544 | 56.0 | 52.07 |
| 12 | | −4.388 | ASP | 0.085 | | | | |
| 13 | Lens 6 | 2.229 | ASP | 0.533 | Plastic | 1.534 | 55.9 | 13.82 |
| 14 | | 2.928 | ASP | 1.054 | | | | |
| 15 | Lens 7 | 6.474 | ASP | 0.420 | Plastic | 1.534 | 55.9 | −5.60 |
| 16 | | 1.999 | ASP | 0.500 | | | | |
| 17 | IR-cut filter | Plano | | 0.150 | Glass | 1.517 | 64.2 | — |
| 18 | | Plano | | 0.345 | | | | |
| 19 | Image | Plano | | — | | | | |

Reference wavelength is 587.6 nm (d-line).
The effective radius of the surface 1 is 1.650 mm.

TABLE 18

Aspheric Coefficients

| Surface # | 2 | 3 | 4 | 5 | 7 | 8 | 9 |
|---|---|---|---|---|---|---|---|
| k = | −4.5445E−01 | −2.1761E+01 | −2.6140E+01 | −2.4105E+00 | 1.8753E+00 | −9.0000E+01 | −7.6075E+01 |
| A4 = | 4.1302E−03 | 3.2581E−02 | 5.1941E−02 | −2.6960E−02 | −3.0479E−02 | −1.9186E−02 | −5.1391E−02 |
| A6 = | −2.7932E−03 | −2.8682E−02 | −7.4595E−02 | 1.5222E−02 | 3.0393E−02 | −2.5446E−03 | −2.3208E−02 |
| A8 = | 2.7958E−03 | 1.4736E−02 | 4.9254E−02 | −3.0722E−02 | −4.8862E−02 | 9.8239E−03 | 1.0201E−02 |
| A10 = | −2.2753E−03 | −5.2315E−03 | −1.9965E−02 | 2.3762E−02 | 3.5506E−02 | −5.9129E−03 | −1.7966E−03 |
| A12 = | 8.3060E−04 | 1.2253E−03 | 4.6585E−03 | −7.8795E−03 | −1.1156E−02 | 2.6979E−03 | 1.9915E−03 |
| A14 = | −1.3085E−04 | −1.6143E−04 | −4.7812E−04 | 9.3533E−04 | 1.3164E−03 | −3.9240E−04 | −7.2069E−04 |
| A16 = | | | | | | | 4.5597E−05 |

| Surface # | 10 | 11 | 12 | 13 | 14 | 15 | 16 |
|---|---|---|---|---|---|---|---|
| k = | 6.4983E+01 | −7.9970E+01 | −7.6733E+01 | −7.5882E−01 | −5.2630E−01 | 1.0878E+00 | −7.3030E+00 |
| A4 = | −1.5669E−02 | −3.4595E−02 | −1.4314E−01 | −5.2624E−02 | 2.1822E−02 | −1.4907E−01 | −7.6094E−02 |
| A6 = | −3.1011E−02 | 7.2904E−02 | 1.4516E−01 | 9.9099E−03 | −3.2152E−02 | 6.1702E−02 | 3.2174E−02 |
| A8 = | 1.1306E−02 | −1.1773E−01 | −1.3910E−01 | −1.2308E−02 | 1.0227E−02 | −1.9662E−02 | −1.0963E−02 |
| A10 = | −4.0888E−04 | 1.1392E−01 | 9.9086E−02 | 7.0215E−03 | −1.6518E−03 | 4.4931E−03 | 2.6426E−03 |
| A12 = | 8.0736E−05 | −7.8718E−02 | −5.0083E−02 | −2.7622E−03 | 8.6889E−05 | −6.2296E−04 | −4.4229E−04 |
| A14 = | −3.2303E−05 | 3.7755E−02 | 1.7030E−02 | 8.0529E−04 | 1.5968E−05 | 4.7248E−05 | 4.9607E−05 |
| A16 = | 7.0949E−06 | −1.1702E−02 | −3.6714E−03 | −1.6795E−04 | −3.1585E−06 | −1.7668E−06 | −3.4892E−06 |
| A18 = | | 2.0850E−03 | 4.4987E−04 | 2.0937E−05 | 1.9361E−07 | 3.2716E−08 | 1.3750E−07 |
| A20 = | | −1.6015E−04 | −2.3624E−05 | −1.0968E−06 | −3.2506E−09 | −7.6015E−10 | −2.3066E−09 |

In the 9th embodiment, the equation of the aspheric surface profiles of the aforementioned lens elements is the same as the equation of the 1st embodiment. A4-A20 represent the aspheric coefficients ranging from the 4th order to the 20th order. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | | | |
|---|---|---|---|
| f (mm) | 5.38 | T67/T34 | 2.55 |
| Fno | 1.64 | T67/T45 | 3.17 |
| HFOV (deg.) | 37.9 | T67/T56 | 12.40 |
| CRA1.0Y (deg.) | 42.2 | TL/EPD | 2.06 |
| V40 | 2 | TL/ImgH | 1.59 |

-continued

| 9th Embodiment | | | |
|---|---|---|---|
| V30 | 2 | $(TL^2)/(EPD \times ImgH)$ | 3.28 |
| V20 | 0 | EPD/R14 | 1.64 |
| T23/T34 | 0.19 | 2 × Y72/EPD | 2.05 |
| T67/T12 | 11.71 | f/R13 + f/R14 | 3.52 |
| T67/T23 | 13.69 | | |

10th Embodiment

Figure 19:
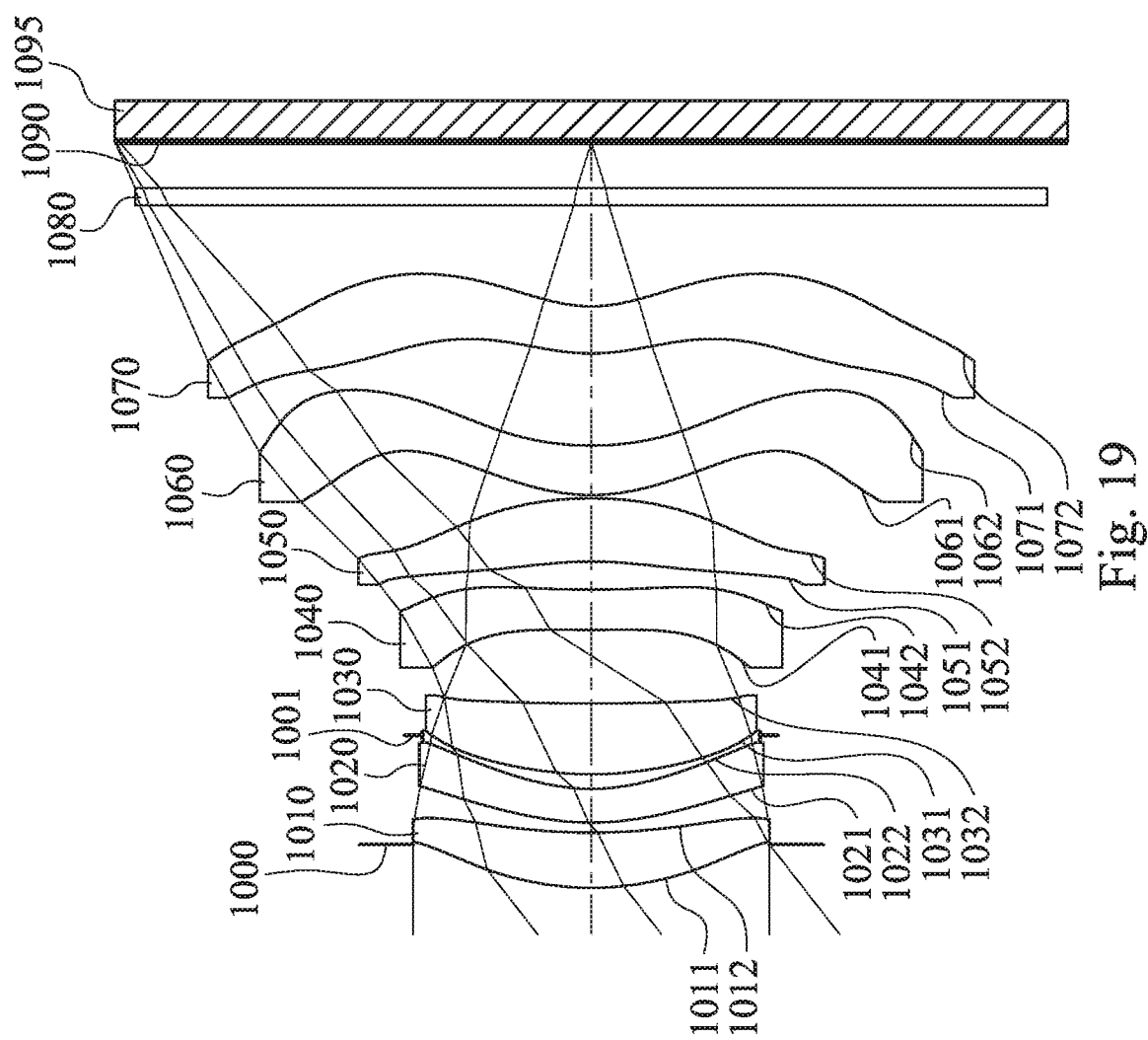
FIG. 19 is a schematic view of an imaging apparatus according to the 10th embodiment of the present disclosure.
Figure 20:
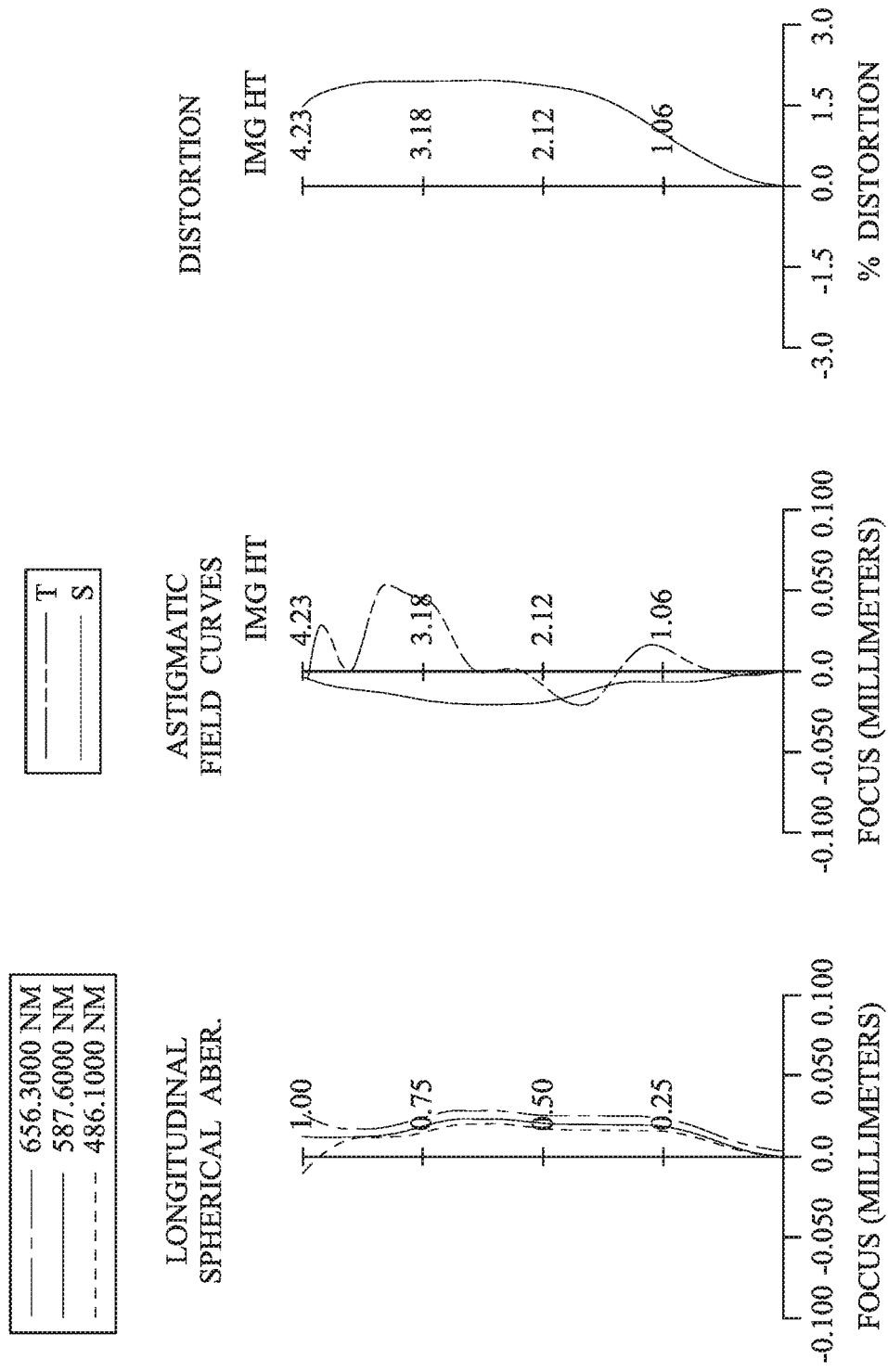
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes an image capturing lens assembly (its reference numeral is omitted) and an image sensor 1095. The image capturing lens assembly includes, in order from an object side to an image side, an aperture stop 1000, a first lens element 1010, a second lens element 1020, a stop 1001, a third lens element 1030, a fourth lens element 1040, a fifth lens element 1050, a sixth lens element 1060, a seventh lens element 1070, an IR-cut filter 1080 and an image surface 1090. The image sensor 1095 is disposed on the image surface 1090 of the image capturing lens assembly. The image capturing lens assembly includes seven lens elements (1010, 1020, 1030, 1040, 1050, 1060 and 1070) without additional one or more lens elements inserted between the first lens element 1010 and the seventh lens element 1070.

The first lens element 1010 with positive refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of a plastic material, and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of a plastic material, and has the object-side surface 1041 and the image-side surface 1042 being both aspheric.

The fifth lens element 1050 with negative refractive power has an object-side surface 1051 being concave in a paraxial region thereof and an image-side surface 1052 being convex in a paraxial region thereof. The fifth lens element 1050 is made of a plastic material, and has the object-side surface 1051 and the image-side surface 1052 being both aspheric.

The sixth lens element 1060 with positive refractive power has an object-side surface 1061 being convex in a paraxial region thereof and an image-side surface 1062 being concave in a paraxial region thereof. The sixth lens element 1060 is made of a plastic material, and has the object-side surface 1061 and the image-side surface 1062 being both aspheric.

The seventh lens element 1070 with negative refractive power has an object-side surface 1071 being convex in a paraxial region thereof and an image-side surface 1072 being concave in a paraxial region thereof. The seventh lens element 1070 is made of a plastic material, and has the object-side surface 1071 and the image-side surface 1072 being both aspheric. Moreover, the image-side surface 1072 of the seventh lens element 1070 includes at least one convex shape in an off-axis region thereof.

The IR-cut filter 1080 is made of a glass material and located between the seventh lens element 1070 and the image surface 1090, and will not affect the focal length of the image capturing lens assembly.

The detailed optical data of the 10th embodiment are shown in TABLE 19 and the aspheric surface data are shown in TABLE 20 below.

TABLE 19

10th Embodiment
f = 5.33 mm, Fno = 1.68, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.386 | | | | |
| 2 | Lens 1 | 2.709 | ASP | 0.491 | Plastic | 1.545 | 56.0 | 8.74 |
| 3 | | 5.891 | ASP | 0.089 | | | | |
| 4 | Lens 2 | 2.531 | ASP | 0.300 | Plastic | 1.669 | 19.5 | −12.08 |
| 5 | | 1.836 | ASP | 0.476 | | | | |
| 6 | Stop | Plano | | −0.346 | | | | |
| 7 | Lens 3 | 3.144 | ASP | 0.630 | Plastic | 1.544 | 56.0 | 7.08 |
| 8 | | 15.950 | ASP | 0.657 | | | | |
| 9 | Lens 4 | 55.808 | ASP | 0.357 | Plastic | 1.669 | 19.5 | −14.33 |
| 10 | | 8.157 | ASP | 0.250 | | | | |
| 11 | Lens 5 | −3.487 | ASP | 0.562 | Plastic | 1.584 | 28.2 | −108.11 |
| 12 | | −3.910 | ASP | 0.030 | | | | |
| 13 | Lens 6 | 1.764 | ASP | 0.441 | Plastic | 1.544 | 56.0 | 7.58 |
| 14 | | 2.812 | ASP | 0.819 | | | | |
| 15 | Lens 7 | 1.754 | ASP | 0.420 | Plastic | 1.534 | 55.9 | −11.54 |
| 16 | | 1.252 | ASP | 0.900 | | | | |
| 17 | IR-cut filter | Plano | | 0.150 | Glass | 1.517 | 64.2 | — |
| 18 | | Plano | | 0.416 | | | | |
| 19 | Image | Plano | | — | | | | |

Reference wavelength is 587.6 nm (d-line).
The effective radius of the surface 6 is 1.500 mm.
The effective radius of the surface 10 is 1.700 mm.

TABLE 20

Aspheric Coefficients

| Surface # | 2 | 3 | 4 | 5 | 7 | 8 | 9 |
|---|---|---|---|---|---|---|---|
| k = | −5.7496E−01 | −2.8958E+01 | −1.3404E+01 | −2.0233E+00 | 2.1586E+00 | 4.8599E+01 | 5.5528E+01 |
| A4 = | 5.5780E−03 | 4.9851E−02 | 8.7403E−02 | −1.6264E−02 | −2.2005E−02 | −1.6334E−02 | −9.2506E−02 |
| A6 = | −6.4312E−04 | −7.4482E−02 | −1.3685E−01 | −2.5899E−02 | 1.1079E−02 | 1.0346E−02 | 2.7995E−02 |
| A8 = | −6.0604E−03 | 6.0867E−02 | 1.1531E−01 | 1.6193E−02 | −3.5614E−02 | −1.1716E−02 | −9.2854E−02 |
| A10 = | 4.8065E−03 | −2.9352E−02 | −5.4439E−02 | 2.6964E−03 | 3.5734E−02 | 1.2123E−02 | 1.0164E−01 |
| A12 = | −2.0278E−03 | 6.9792E−03 | 1.3415E−02 | −3.6892E−03 | −1.3349E−02 | −5.1207E−03 | −5.0803E−02 |
| A14 = | 2.7313E−04 | −6.5355E−04 | −1.3389E−03 | 6.0768E−04 | 1.7721E−03 | 9.9384E−04 | 1.2239E−02 |
| A16 = | | | | | | | −1.1486E−03 |

| Surface # | 10 | 11 | 12 | 13 | 14 | 15 | 16 |
|---|---|---|---|---|---|---|---|
| k = | −6.1099E+01 | −7.3167E+01 | −6.7479E+01 | −7.1519E−01 | −7.4585E−01 | −1.5084E+00 | −3.4812E+00 |
| A4 = | −3.7724E−02 | −9.5964E−02 | −2.1191E−01 | −7.7249E−02 | 6.4199E−02 | −2.1939E−01 | −1.1960E−01 |
| A6 = | 3.6230E−02 | 2.3555E−01 | 2.0822E−01 | 4.4998E−02 | −6.0101E−02 | 1.0137E−01 | 5.5377E−02 |
| A8 = | −6.2840E−02 | −2.4185E−01 | −1.5253E−01 | −3.9850E−02 | 1.9908E−02 | −3.6815E−02 | −2.0065E−02 |
| A10 = | 3.8952E−02 | 1.4468E−01 | 8.6808E−02 | 1.8602E−02 | −3.8127E−03 | 1.0069E−02 | 5.1213E−03 |
| A12 = | −1.0683E−02 | −5.8680E−02 | −3.6499E−02 | −5.1546E−03 | 4.3619E−04 | −1.8733E−03 | −8.8807E−04 |
| A14 = | 1.0668E−03 | 1.7638E−02 | 1.0716E−02 | 8.6017E−04 | −2.7805E−05 | 2.2575E−04 | 1.0122E−04 |
| A16 = | 1.7755E−05 | −3.8990E−03 | −2.0085E−03 | −8.2530E−05 | 8.0902E−07 | −1.6844E−05 | −7.1724E−06 |
| A18 = | | 5.5235E−04 | 2.1081E−04 | 4.0513E−06 | −1.4927E−08 | 7.0697E−07 | 2.8417E−07 |
| A20 = | | −3.6177E−05 | −9.3392E−06 | −7.3815E−08 | 9.7637E−10 | −1.2752E−08 | −4.7902E−09 |

In the 10th embodiment, the equation of the aspheric surface profiles of the aforementioned lens elements is the same as the equation of the 1st embodiment. A4-A20 represent the aspheric coefficients ranging from the 4th order to the 20th order. Also, the definitions of these parameters shown in the following table are the same as those stated in the 1st embodiment with corresponding values for the 10th embodiment, so an explanation in this regard will not be provided again.

Moreover, these parameters can be calculated from TABLE 19 and TABLE 20 as the following values and satisfy the following conditions:

| 10th Embodiment | | | |
|---|---|---|---|
| f (mm) | 5.33 | T67/T34 | 1.25 |
| Fno | 1.68 | T67/T45 | 3.28 |
| HFOV (deg.) | 38.0 | T67/T56 | 27.30 |
| CRA1.0Y (deg.) | 30.6 | TL/EPD | 2.09 |
| V40 | 3 | TL/ImgH | 1.57 |
| V30 | 3 | (TL$^2$)/(EPD × ImgH) | 3.28 |
| V20 | 2 | EPD/R14 | 2.53 |
| T23/T34 | 0.20 | 2 × Y72/EPD | 2.15 |
| T67/T12 | 9.20 | f/R13 + f/R14 | 7.30 |
| T67/T23 | 6.30 | | |

11th Embodiment

Figure 23:
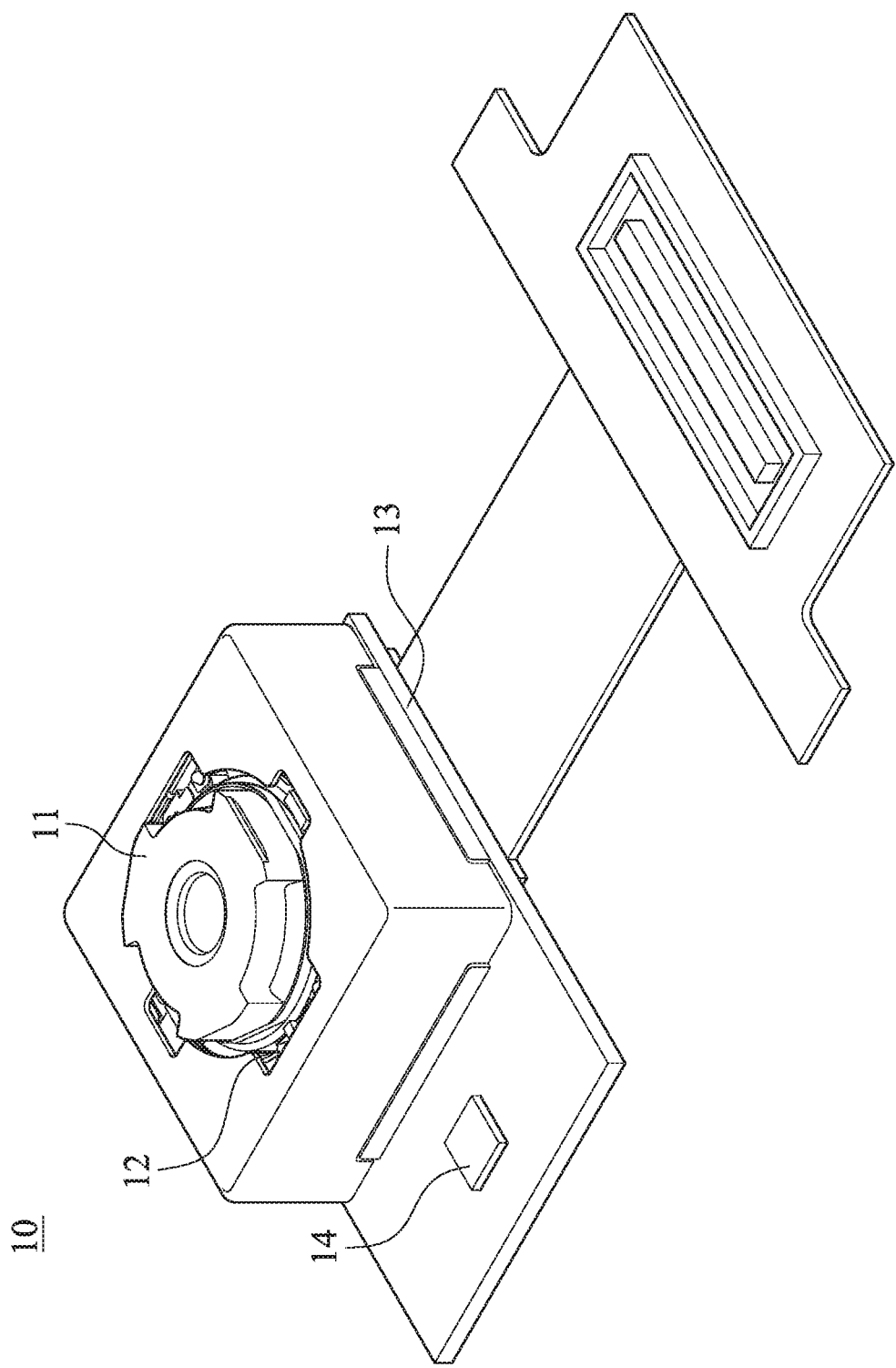
FIG. 23 is a three-dimensional view of an imaging apparatus according to the 11th embodiment of the present disclosure.

FIG. 23 is a three-dimensional view of an imaging apparatus 10 according to the 11th embodiment of the present disclosure. In FIG. 23, the imaging apparatus 10 according to the 11th embodiment is a camera module. The imaging apparatus 10 includes an imaging lens module 11, a driving assembly 12 and an image sensor 13, wherein the imaging lens module 11 includes the image capturing lens assembly according to the 1st embodiment and a barrel (its reference numeral is omitted) for carrying the image capturing lens assembly. An image of an imaged object can be captured by the imaging apparatus 10 via the imaging lens module 11, the driving assembly 12 is used to bring the image into focus so that the image can be clearly formed on the image sensor 13, and then the data of the image is outputted.

The driving assembly 12 can have an auto-focus functionality, and a driving method thereof can use a voice coil motor (VCM), a micro electro-mechanical system (MEMS), a piezoelectric system or a shape memory alloy system. The driving assembly 12 enables the image capturing lens assembly to obtain a preferable imaging position, so that the imaged object in different object distances can be imaged clearly.

The image sensor 13 of the imaging apparatus 10 can have the properties of high photosensitivity and low noise (such as CMOS and CCD) and is disposed on the image surface of the image capturing lens assembly, so that the excellent image quality of the image capturing lens assembly can be truly presented.

Moreover, the imaging apparatus 10 can further include an image stabilizing module 14. The image stabilizing module 14 can exemplarily include an accelerator, a gyroscope or a Hall Effect sensor. In the 11th embodiment, the image stabilizing module 14 is a gyroscope. However, it is only exemplary and the image stabilizing module 14 is not limited thereto. By adjusting the changes in different axial directions of the image capturing lens assembly, the blurry image due to motion during exposure can be compensated, so that the image quality of dynamic scenes or low-light scenes can be enhanced. Moreover, the advanced image compensation functions, such as optical image stabilization (OIS) or electronic image stabilization (EIS), can be provided.

12th Embodiment

Figure 24A:
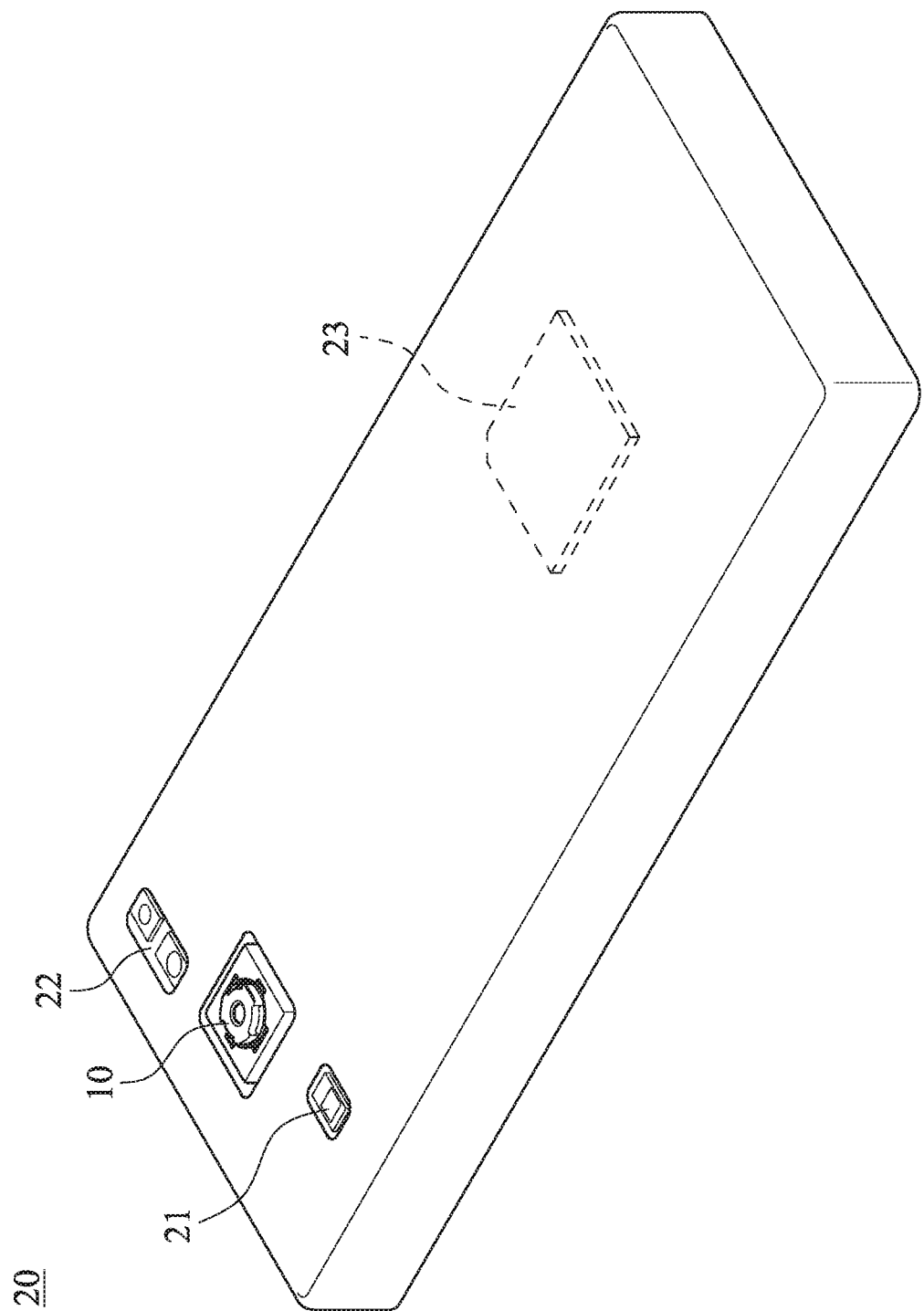
FIG. 24A is a schematic view showing a side of an electronic device according to the 12th embodiment of the present disclosure.
Figure 24B:
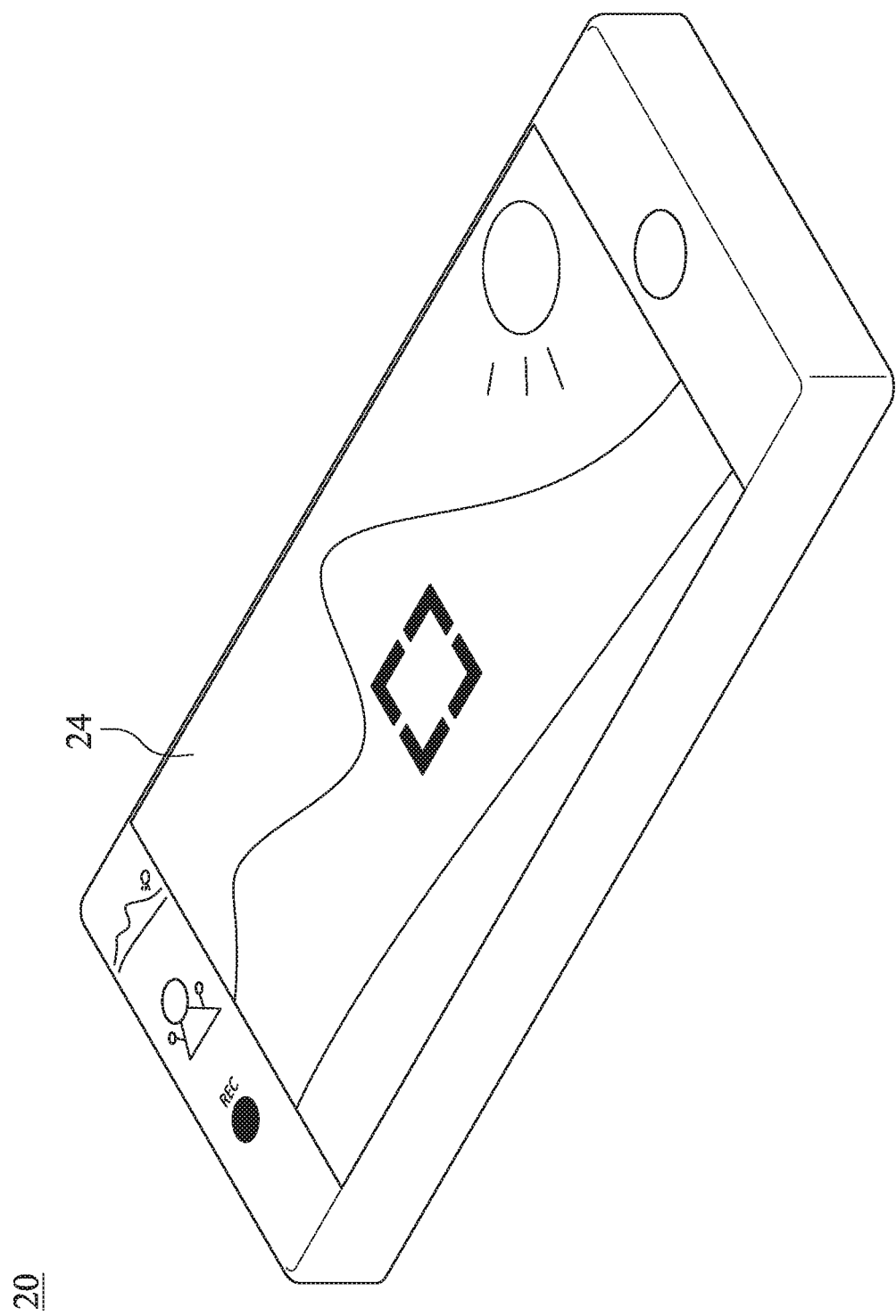
FIG. 24B is a schematic view showing another side of the electronic device in FIG. 24A.
Figure 24C:
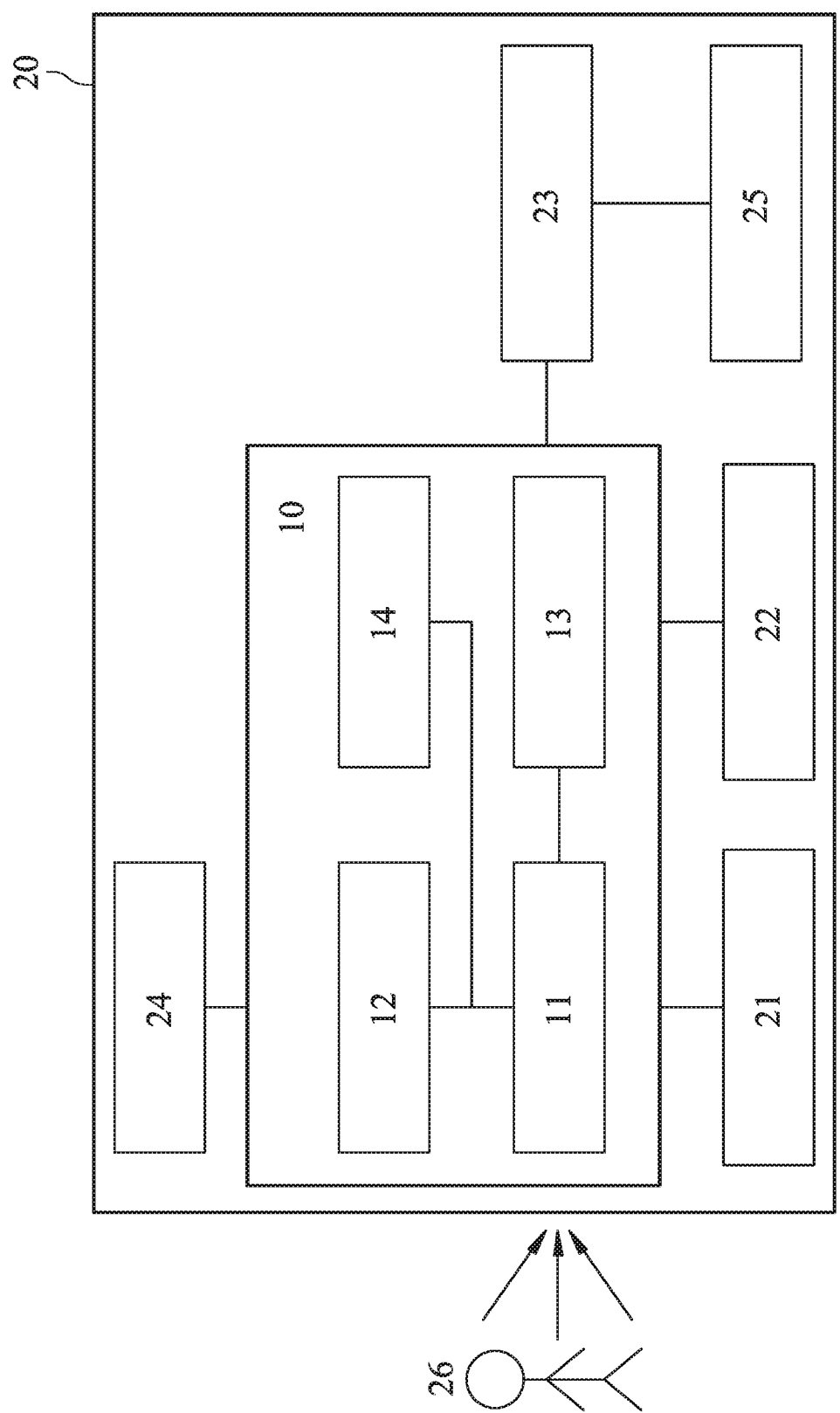
FIG. 24C is a block diagram of the electronic device in FIG. 24A.

FIG. 24A is a schematic view showing a side of an electronic device 20 according to the 12th embodiment of the present disclosure. FIG. 24B is a schematic view showing another side of the electronic device 20 in FIG. 24A. FIG. 24C is a block diagram of the electronic device 20 in FIG. 24A. In FIG. 24A, FIG. 24B and FIG. 24C, the electronic device 20 of the 12th embodiment is a smartphone. The electronic device 20 includes the imaging apparatus 10, a flash module 21, an auxiliary focusing module 22, an image signal processor 23, a user interface 24 and an image software processor 25. When a user takes a photograph via the user interface 24, light rays of the imaged object 26 are focused by the electronic device 20 via the imaging apparatus 10 for generating an image. Meanwhile, a light compensation function is provided by the flash module 21, the object distance of the imaged objected 26 is provided by the auxiliary focusing module 22 for quick focusing, and an optimized image processing is provided by the image signal processor 23 and the image software processor 25, so that the image quality of the image capturing lens assembly can be further enhanced. The auxiliary focusing module 22 can adopt conventional infrared or laser for quick focusing. The user interface 24 can adopt a touch screen or a physical button, and an image software processor 25 can be coordinated with the user interface 24 for providing a variety of shooting modes and a variety of image processing modifications.

The imaging apparatus 10 of the 12th embodiment can be the same as the imaging apparatus 10 of the 11th embodiment, and are not repeated herein.

13th Embodiment

Figure 25:
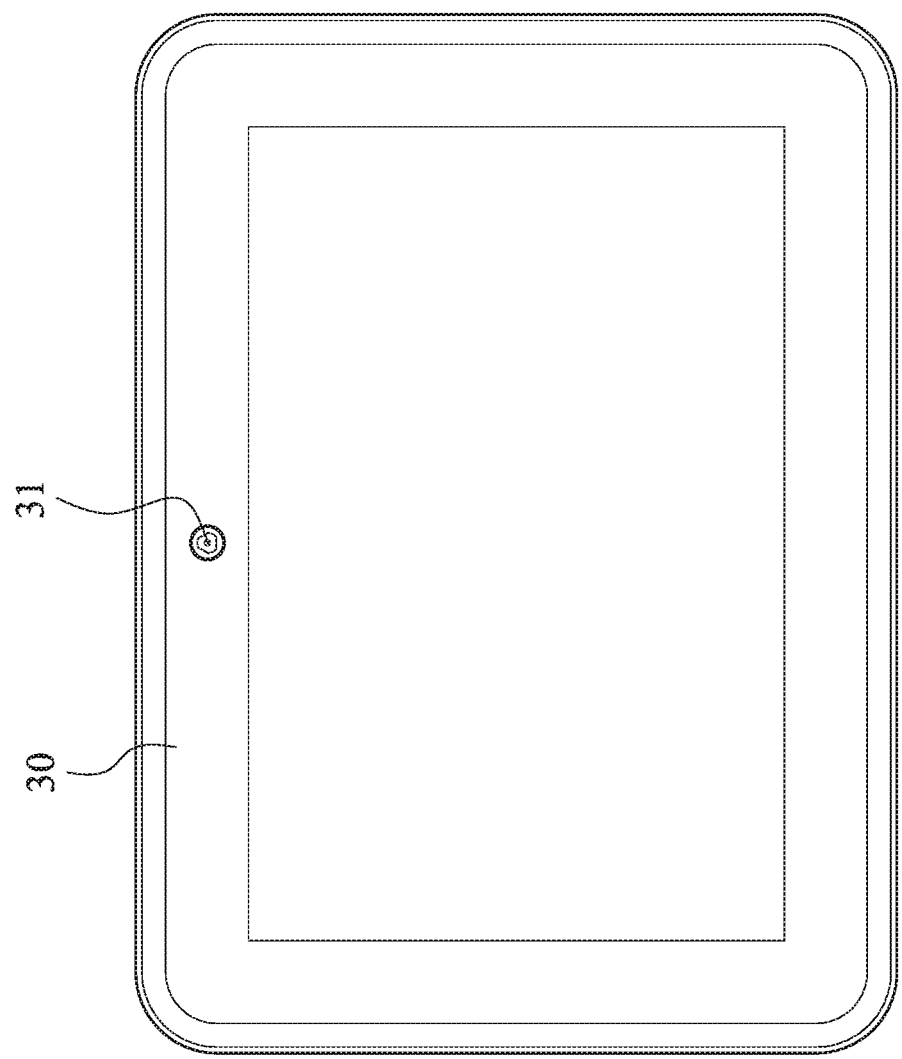
FIG. 25 is a schematic view of an electronic device according to the 13th embodiment of the present disclosure.

FIG. 25 is a schematic view of an electronic device 30 according to the 13th embodiment of the present disclosure. The electronic device 30 of the 13th embodiment is a tablet personal computer. The electronic device 30 includes an imaging apparatus 31. The imaging apparatus 31 can be the same as that of the 11th embodiment, and will not be repeated herein.

14th Embodiment

Figure 26:
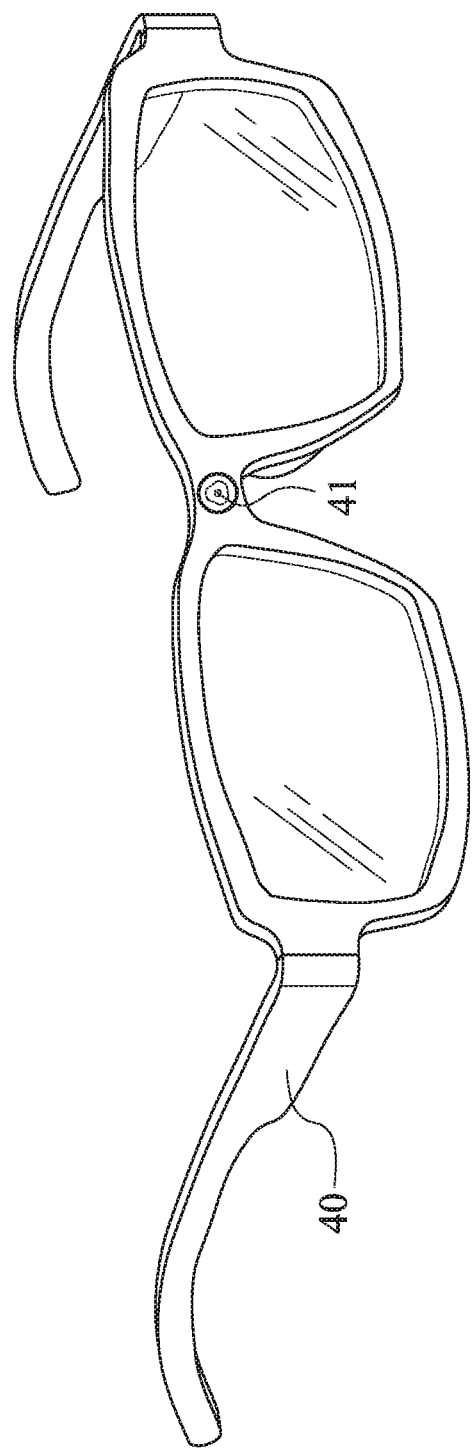
FIG. 26 is a schematic view of an electronic device according to the 14th embodiment of the present disclosure.

FIG. 26 is a schematic view of an electronic device 40 according to the 14th embodiment of the present disclosure. The electronic device 40 of the 14th embodiment is a wearable device. The electronic device 40 includes an imaging apparatus 41. The imaging apparatus 41 can be the same as that of the 11th embodiment, and will not be repeated herein.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising seven lens elements, the seven lens elements being, in order from an object side to an image side, a first lens element, a second lens element, a third lens element, a fourth lens element, a fifth lens element, a sixth lens element and a seventh lens element;
wherein the fifth lens element has positive refractive power;
the sixth lens element has an image-side surface being concave in a paraxial region thereof, and an object-side surface and the image-side surface of the sixth lens element are aspheric;
the seventh lens element with negative refractive power has an image-side surface being concave in a paraxial region thereof and comprising at least one convex shape in an off-axis region thereof, an object-side surface and the image-side surface of the seventh lens element are aspheric;
wherein a total number of lens elements having Abbe numbers less than 20 is V20, an axial distance between an object-side surface of the first lens element and an image surface is TL, an entrance pupil diameter of the image capturing lens assembly is EPD, and the following conditions are satisfied:

$3 \leq V20$; and $1.0 < TL/EPD \leq 2.40$.

2. The image capturing lens assembly of claim 1, wherein the axial distance between the object-side surface of the first lens element and the image surface is TL, a maximum image height of the image capturing lens assembly is ImgH, and the following condition is satisfied:

$0.80 < TL/ImgH < 1.70$.

3. The image capturing lens assembly of claim 1, wherein an axial distance between the first lens element and the second lens element is T12, an axial distance between the second lens element and the third lens element is T23, an axial distance between the sixth lens element and the seventh lens element is T67, and the following conditions are satisfied:

$1.0 < T67/T12$; and $1.0 < T67/T23$.

4. The image capturing lens assembly of claim 1, wherein an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, and the following conditions are satisfied:

$1.0 < T67/T34$;

$1.0 < T67/T45$; and $1.0 < T67/T56$.

5. The image capturing lens assembly of claim 1, wherein a total number of lens elements having Abbe numbers less than 30 is V30, and the following condition is satisfied:

$4 \leq V30$.

6. The image capturing lens assembly of claim 1, wherein an f-number of the image capturing lens assembly is Fno, and the following condition is satisfied:

$1.0 < Fno \leq 1.70$.

7. The image capturing lens assembly of claim 1, wherein the axial distance between the object-side surface of the first lens element and the image surface is TL, the entrance pupil diameter of the image capturing lens assembly is EPD, a maximum image height of the image capturing lens assembly is ImgH, and the following condition is satisfied:

$2.0 < (TL^2)/(EPD \times ImgH) < 3.20$.

8. The image capturing lens assembly of claim 1, wherein a total number of lens elements having Abbe numbers less than 40 is V40, and the following condition is satisfied:

$$4 \leq V40.$$

9. The image capturing lens assembly of claim 1, wherein an axial distance between the second lens element and the third lens element is T23, an axial distance between the third lens element and the fourth lens element is T34, and the following condition is satisfied:

$$T23/T34 \leq 0.90.$$

10. The image capturing lens assembly of claim 1, wherein the fifth lens element has the image-side surface being convex in a paraxial region thereof.

11. The image capturing lens assembly of claim 1, wherein the entrance pupil diameter of the image capturing lens assembly is EPD, a curvature radius of the image-side surface of the seventh lens element is R14, and the following condition is satisfied:

$$1.50 < EPD/R14 < 4.0.$$

12. The image capturing lens assembly of claim 1, wherein a focal length of the image capturing lens assembly is f, a curvature radius of the object-side surface of the seventh lens element is R13, a curvature radius of the image-side surface of the seventh lens element is R14, and the following condition is satisfied:

$$4.0 < (f/R13) + (f/R14) < 10.0.$$

13. An imaging apparatus, comprising:
the image capturing lens assembly of claim 1; and
an image sensor, wherein the image sensor is disposed on the image surface of the image capturing lens assembly.

14. An electronic device, comprising:
the imaging apparatus of claim 13.

15. An image capturing lens assembly comprising seven lens elements, the seven lens elements being, in order from an object side to an image side, a first lens element, a second lens element, a third lens element, a fourth lens element, a fifth lens element, a sixth lens element and a seventh lens element;
wherein the sixth lens element has an image-side surface being concave in a paraxial region thereof, and an object-side surface and the image-side surface of the sixth lens element are aspheric;
the seventh lens element with negative refractive power has an image-side surface being concave in a paraxial region thereof and comprising at least one convex shape in an off-axis region thereof, an object-side surface and the image-side surface of the seventh lens element are aspheric;
wherein a total number of lens elements having Abbe numbers less than 30 is V30, a total number of lens elements having Abbe numbers less than 20 is V20, an axial distance between an object-side surface of the first lens element and an image surface is TL, an entrance pupil diameter of the image capturing lens assembly is EPD, a maximum image height of the image capturing lens assembly is ImgH, and the following conditions are satisfied:

$$3 \leq V30;$$

$$2 \leq V20;\text{ and}$$

$$2.0 < (TL^2)/(EPD \times ImgH) < 3.20.$$

16. The image capturing lens assembly of claim 15, wherein the axial distance between the object-side surface of the first lens element and the image surface is TL, the maximum image height of the image capturing lens assembly is ImgH, and the following condition is satisfied:

$$0.80 < TL/ImgH < 1.70.$$

17. The image capturing lens assembly of claim 15, wherein an f-number of the image capturing lens assembly is Fno, and the following condition is satisfied:

$$1.0 < Fno \leq 1.70.$$

18. The image capturing lens assembly of claim 15, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, and the following conditions are satisfied:

$$1.0 < T67/T12;$$

$$1.0 < T67/T23;$$

$$1.0 < T67/T34;$$

$$1.0 < T67/T45;\text{ and}$$

$$1.0 < T67/T56.$$

19. The image capturing lens assembly of claim 15, wherein an axial distance between the second lens element and the third lens element is T23, an axial distance between the third lens element and the fourth lens element is T34, and the following condition is satisfied:

$$T23/T34 \leq 0.90.$$

20. The image capturing lens assembly of claim 15, wherein the axial distance between the object-side surface of the first lens element and the image surface is TL, the entrance pupil diameter of the image capturing lens assembly is EPD, and the following condition is satisfied:

$$1.0 < TL/EPD \leq 2.40.$$

21. The image capturing lens assembly of claim 15, wherein the entrance pupil diameter of the image capturing lens assembly is EPD, a curvature radius of the image-side surface of the seventh lens element is R14, and the following condition is satisfied:

$$1.50 < EPD/R14 < 4.0.$$

22. An imaging apparatus, comprising:
the image capturing lens assembly of claim 15; and
an image sensor, wherein the image sensor is disposed on the image surface of the image capturing lens assembly.

23. An electronic device, comprising:
the imaging apparatus of claim 22.

* * * * *